US012487662B2

(12) United States Patent
Ishihara et al.

(10) Patent No.: US 12,487,662 B2
(45) Date of Patent: Dec. 2, 2025

(54) INFORMATION PROCESSING DEVICE, INFORMATION PROCESSING METHOD, AND PROGRAM

(71) Applicant: Sony Group Corporation, Tokyo (JP)

(72) Inventors: Atsushi Ishihara, Kanagawa (JP); Hirotake Ichikawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/782,474

(22) Filed: Jul. 24, 2024

(65) Prior Publication Data

US 2024/0377881 A1    Nov. 14, 2024

Related U.S. Application Data

(63) Continuation of application No. 18/270,407, filed as application No. PCT/JP2022/000146 on Jan. 5, 2022, now Pat. No. 12,105,868.

(30) Foreign Application Priority Data

Feb. 12, 2021    (JP) ................................ 2021-020823

(51) Int. Cl.
   *G06F 3/01*    (2006.01)
   *G06T 11/00*    (2006.01)
(52) U.S. Cl.
   CPC .............. *G06F 3/012* (2013.01); *G06F 3/017* (2013.01); *G06T 11/00* (2013.01)
(58) Field of Classification Search
   CPC ........... G06F 3/012; G06F 3/017; G06T 11/00
   See application file for complete search history.

(56) References Cited

U.S. PATENT DOCUMENTS 11,086,124 B2 *   8/2021   Gullicksen ............ G01S 11/026
2018/0299948 A1 * 10/2018  Kikuchi ................. G06F 3/011
(Continued)

FOREIGN PATENT DOCUMENTS

JP    2012-526334 A    10/2012
JP    2018-120520 A    8/2018
(Continued)

OTHER PUBLICATIONS

Azad et al., Robust Real-time Stereo-based Markerless Human Motion Capture, 2008 8th IEEE-RAS International Conference on Humanoid Robots, Dec. 1-3, 2008, pp. 700-707, XP031825335.

*Primary Examiner* — Kenneth B Lee, Jr.
(74) *Attorney, Agent, or Firm* — Paratus Law Group, PLLC

(57)    ABSTRACT

An information processing device (TM) includes a head information acquisition unit (21), a physical information acquisition unit (22), and a display control unit (30). The head information acquisition unit (21) acquires the position and posture of a head of a user. The physical information acquisition unit (22) acquires a position and posture of a portion of a body other than the head of the user. The display control unit (30) controls display of a virtual object corresponding to the portion of the body, on the basis of a history of the position and posture of the portion of the body and on the basis of the position and posture of the head, in a period before the position and posture of the portion of the body are acquired by the physical information acquisition unit (21).

20 Claims, 16 Drawing Sheets

(56) References Cited

U.S. PATENT DOCUMENTS

2019/0339767 A1\* 11/2019 Andrew ................ G06F 3/017
2020/0089316 A1\* 3/2020 Raskar ................ G06T 7/0002
2021/0322853 A1\* 10/2021 Lockhart ................ G06F 3/017

FOREIGN PATENT DOCUMENTS

| JP | 2020-004388 A | 1/2020 |
| WO | WO 2018/211798 A1 | 11/2018 |
| WO | WO 2019/212793 A1 | 11/2018 |

\* cited by examiner

FIG.8
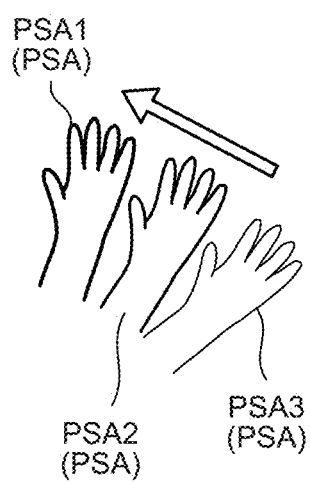
PSA1 (PSA)
PSA2 (PSA)
PSA3 (PSA)
STEP S10
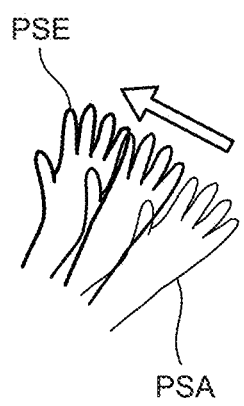
PSE
PSA
STEP S11
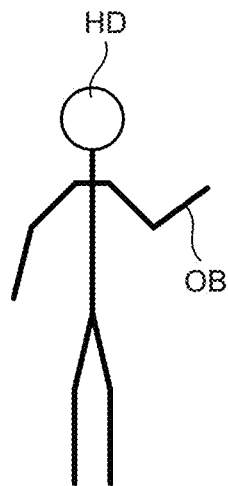
HD
OB
STEP S12

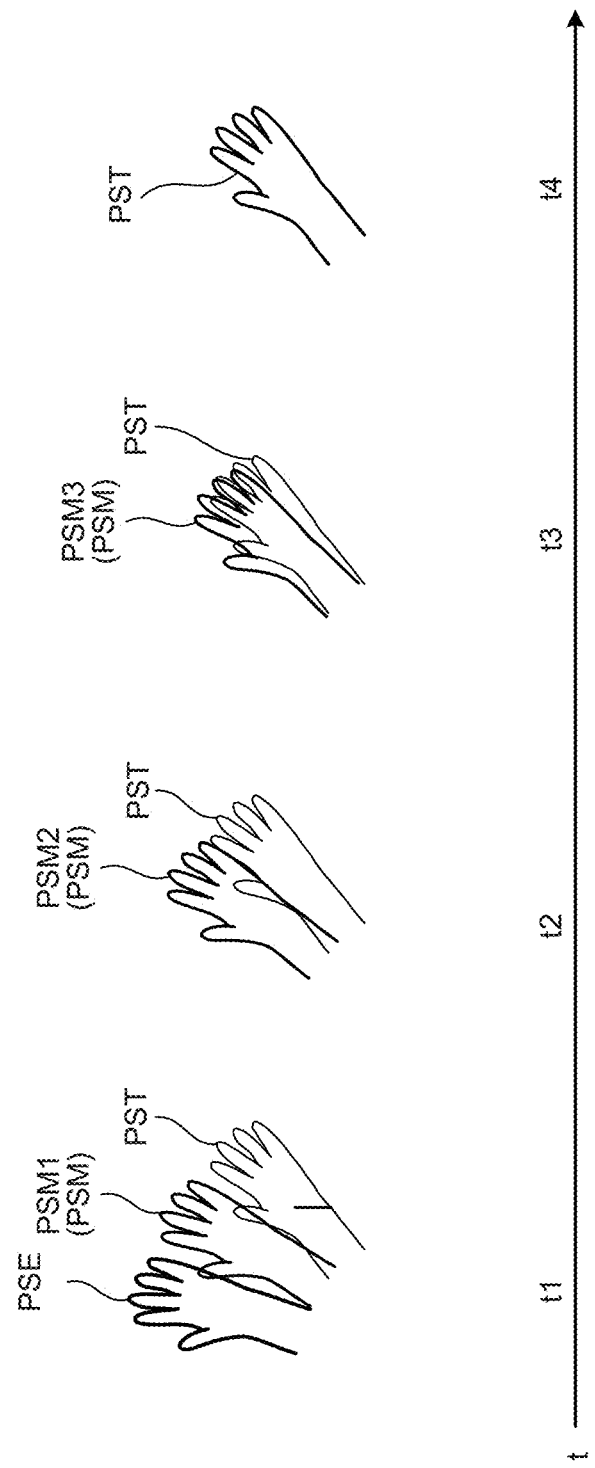

INFORMATION PROCESSING DEVICE, INFORMATION PROCESSING METHOD, AND PROGRAM

CROSS REFERENCE TO PRIOR APPLICATION

This application is a continuation of U.S. patent application Ser. No. 18/270,407 (filed on Jun. 29, 2023), which is a National Stage Patent Application of PCT International Patent Application No. PCT/JP2022/000146 (filed on Jan. 5, 2022) under 35 U.S.C. § 371, which claims priority to Japanese Patent Application No. 2021-020823 (filed on Feb. 12, 2021), which are all hereby incorporated by reference in their entirety.

FIELD

The present disclosure relates to an information processing device, an information processing method, and a program.

BACKGROUND

There is known a technology for a plurality of users to share one virtual space by using a VR technology. Each user transmits position/posture information of a portion of his/her body (e.g., his/her own hand) recognized by a camera mounted on his/her head-mounted display, to the other users together with position/posture information of his/her head. Each user generates avatar videos indicating the other users on the basis of the position/posture information transmitted from the other users.

CITATION LIST

Patent Literature

Patent Literature 1: WO 2018/211798 A

SUMMARY

Technical Problem

In recognition of the user's hand by using the video from the camera, in some cases, the hand may disappear from the angle of view of the camera, resulting in a temporary failure to detect the hand. In this case, the position/posture information of the hand cannot be transmitted to the other users. Therefore, it seems to the other users that the hand has suddenly disappeared. This problem occurs not only in detection of a hand, but also in detection of another part of the body by the camera.

Therefore, the present disclosure proposes an information processing device, an information processing method, and a program that are configured to suppress sudden interruption of drawing of a portion of a body even when detection of the portion of the body has failed.

Solution to Problem

According to the present disclosure, an information processing device is provided that comprises: a head information acquisition unit that acquires a position and posture of a head of a user; a physical information acquisition unit that acquires a position and posture of a portion of a body of the user other than the head; and a display control unit that controls display of a virtual object corresponding to the portion of the body, based on a history of the position and posture of the portion of the body and based on the position and posture of the head, in a period before the position and posture of the portion of the body are acquired by the physical information acquisition unit. According to the present disclosure, an information processing method in which an information process of the information processing device is executed by a computer, and a program causing a computer to perform the information process of the information processing device are provided.

BRIEF DESCRIPTION OF DRAWINGS

FIG. 8 is a diagram illustrating a process performed in transition from a tracking state to a restoration waiting state.

FIG. 17 is a diagram illustrating an example of information processing according to a third embodiment.

DESCRIPTION OF EMBODIMENTS

Figure 1:
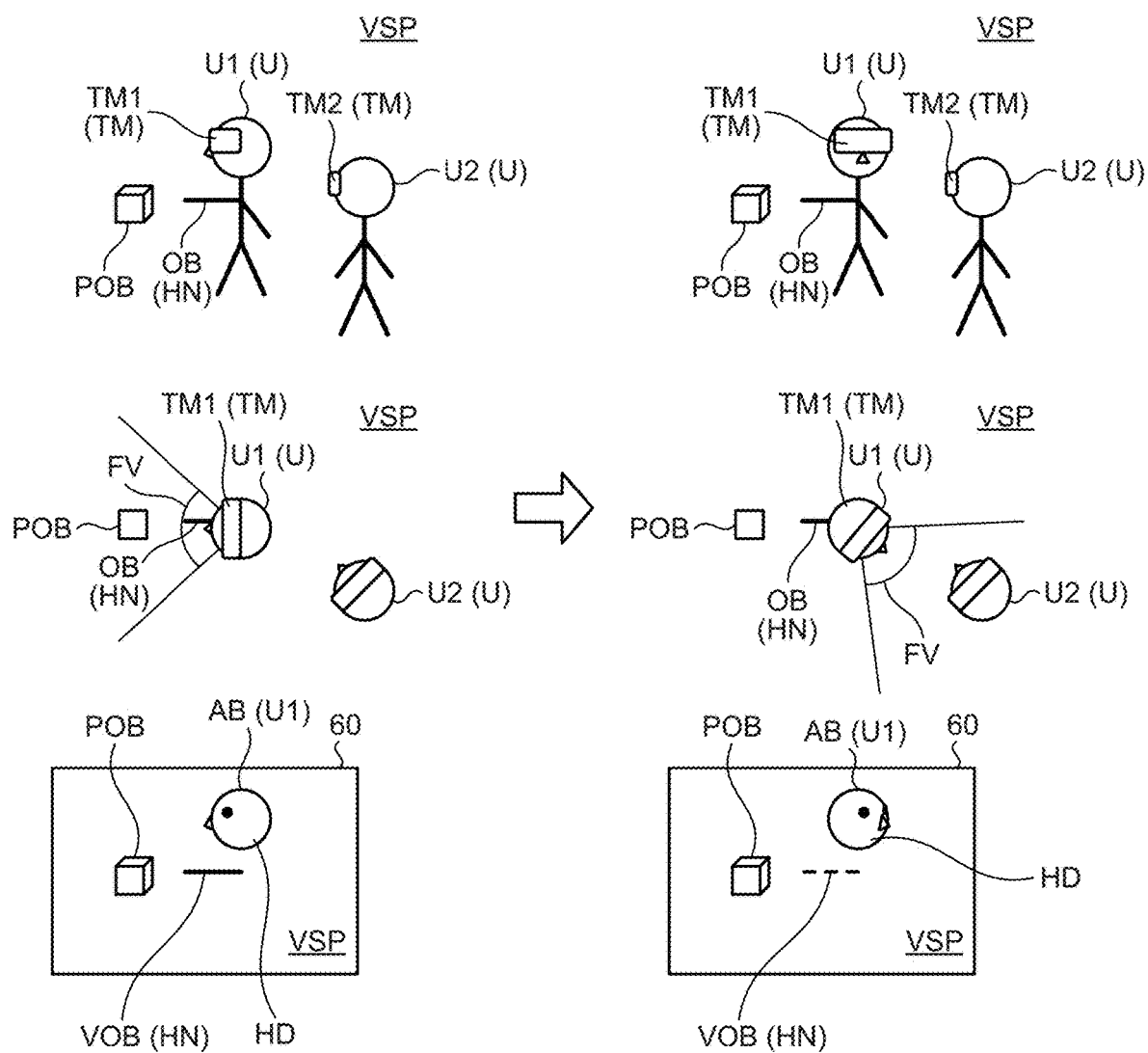
FIG. 1 is a diagram illustrating a background of the present disclosure.

Embodiments of the present disclosure will be described in detail below with reference to the drawings. In the following embodiments, the same portions are denoted by the same reference numerals or symbols, and repetitive description thereof will be omitted.

The description will be made in the following order.
[1. First Embodiment]
   [1-1. Background]
   [1-2. Configuration of terminal]
   [1-3. Transition of detection state]
   [1-4. Information processing method]
   [1-5. Exemplary hardware configuration]
   [1-6. Effects]

[2. Second Embodiment]
[2-1. Information processing method]
[2-2. Effects]
[3. Third Embodiment]
  [3-1. Information processing method]
  [3-2. Effects]

1. First Embodiment 1-1. Background

Figure 2:
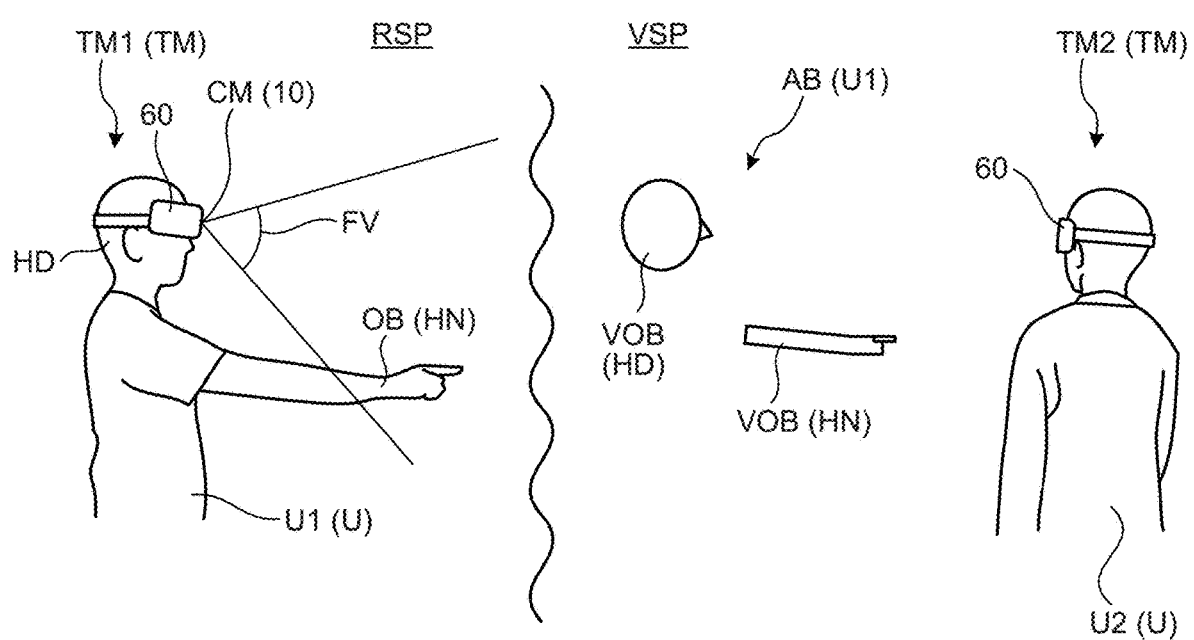
FIG. 2 is a diagram illustrating a background of the present disclosure.
Figure 3:
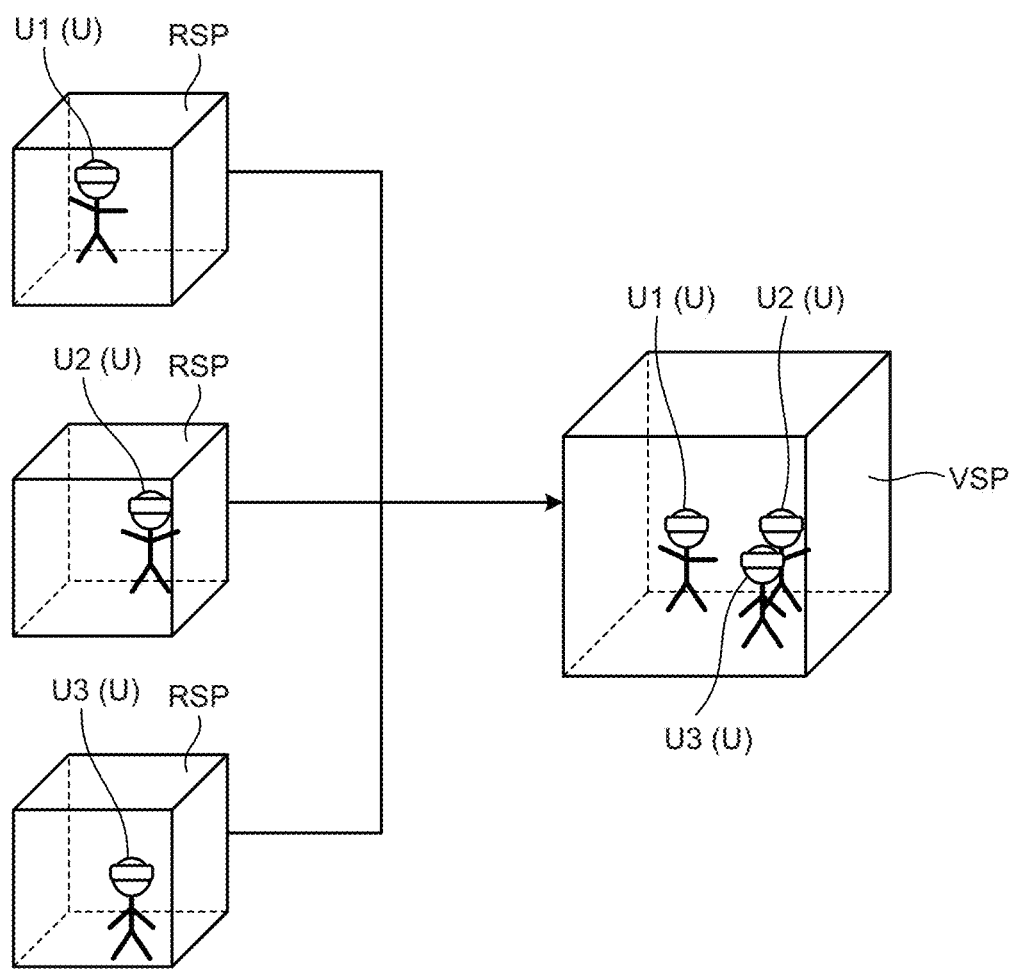
FIG. 3 is a diagram illustrating a background of the present disclosure.

FIGS. 1 to 3 are diagrams each illustrating a background of the present disclosure.

As illustrated in FIG. 1, the present disclosure assumes a case where a plurality of users U shares one virtual space VSP via terminals TM such as head mounted displays (HMD). Hereinafter, in a case where the plurality of users U is distinguished, numbers are each assigned after the reference symbol of each user U. In a case where a plurality of the terminals TM is distinguished, the numbers of the users U holding the terminals TM are each assigned after the symbol of each terminal TM.

As illustrated in FIG. 2, each terminal TM includes a display unit 60 and a sensor unit 10. The sensor unit 10 includes a camera CM. The camera CM has a field of view FV in a viewing direction of the user U. Each terminal TM detects an object OB in a real space RSP positioned around each user U on the basis of a video captured by each camera CM. The object OB includes a portion of the body of the user U. In the example of FIG. 2, a hand HN of the user U is detected as the portion of the body of the user U. The terminal TM detects a position and posture of the hand HN and a position and posture of a head HD of the user U, on the basis of sensor information. The terminal TM transmits information (position/posture information) about the positions and postures of the hand HD and the head HD to the terminal TM of another user U.

For example, in the example of FIG. 2, a user U1 indicates something with the hand HN. The camera CM of the user U1 captures a video of the hand HN positioned in the field of view FV. A terminal TM1 transmits information about the positions and postures of the head HD and the hand HN of the user U1 to a terminal TM2. The terminal TM2 generates an avatar AB of the user U1 on the basis of the information transmitted from the terminal TM1, and displays the avatar AB on the display unit 60. The avatar AB includes a virtual object VOB corresponding to the head HD of the user U1 and a virtual object VOB corresponding to the hand HN.

The plurality of users U are enabled to communicate in the virtual space VSP via the avatars AB. As illustrated in FIG. 3, the plurality of users U are located at positions away from each other, and cannot directly know how they are, from each other. However, each user U can recognize how the other users U are by watching the movement of the avatars AB of the other users U on the display unit 60. Note that although FIG. 3 illustrates an example in which a plurality of users U (user U1, user U2, and user U3) are located at different places (e.g., different rooms) in the real space RSP, the plurality of users U may be located at near places (e.g., the same room).

FIG. 1 illustrates a state in which the user U1 tries to explain a specific object POB for the user U2 while indicating the specific object POB with the hand HN. The upper and middle sides of FIG. 1 are diagrams illustrating the situations of the users U viewed from a side and from the top. The lower side of FIG. 1 are diagrams each illustrating an image displayed on the display unit 60 of the user U2.

The left side of FIG. 1 illustrates how the user U1 guides the user U2 while looking at a direction indicated by the hand HN. The right side of FIG. 1 illustrates how the user U1 looks back at and explains to the user U2. In the example on the left side of FIG. 1, the hand HN of the user U1 is positioned in the field of view FN of the camera CM. Therefore, the virtual objects VOB corresponding to the head HD and the hand HN of the user U1 are displayed on the display unit 60 of the terminal TM2. In the example on the right side of FIG. 1, the hand HN of the user U1 is out of the field of view FN of the camera CM. The position and posture of the hand HN of the user U1 are not detected, and therefore, only the position/posture information of the head HD of the user U1 is transmitted to the terminal TM2. Accordingly, only the virtual object VOB corresponding to the head HD of the user U1 is displayed on the display unit 60 of the terminal TM2.

As described above, when the detection of the hand HN has failed, the position/posture information of the hand HN cannot be transmitted to another terminal TM. In the another terminal TM, the virtual object VOB corresponding to the hand HN cannot be drawn, and therefore, it seems that the hand HN has temporarily disappeared.

Usually, the user U is not conscious of the field of view FV of the camera CM, and therefore, it is difficult for the user U talking with another user U to notice that his/her hand HN is out of the field of view FV. Even if the hand HN always appears in the field of view FV, a temporary failure in the detection of the hand HN may occur due to the influence of light or the like. The sudden disappearance of the hand HN displayed until then may give the user U2 a feeling of strangeness.

In order to always capture the object OB to be recognized within the field of view FV, it is necessary to widen the angle of view of the camera CM as much as possible or to increase the number of cameras CM. When the angle of view of the camera CM is widened, the distortion of an input image generally increases, increasing the difficulty of correction and a processing load. For increasing the number of cameras CM, it is necessary to deal with an increase in cost, securing an arrangement place, and an increase in power consumption or amount of heat generated. In addition, it is necessary to accurately associate the processing results in the cameras CM temporally and spatially, complicating the processing.

There is also a case to deal with the above problem without changing the angle of view of the camera CM or the number of the cameras CM. In Patent Literature 1, against the failure in the detection of the hand HN, the movement of the avatar AB is made closer to a natural movement by continuing a past state or transition to a predefined operation of "fluctuation operation". However, if a past position is continuously used while the hand HN is moving, the movement of the hand HN stops there, and it is considered that the appearance becomes unnatural. If the fluctuation operation is adopted, disappearance of the virtual object VOB located until then can be avoided, but the relevance to the previous operation is lost.

Therefore, the present disclosure proposes a method of determining a current position and posture of the hand HN on the basis of the position/posture information of the hand HN detected in the past. This method makes it possible to maintain the continuity of the position and posture of the hand HN before and after the failure in detection of the hand HN. Hereinafter, the position and posture detected on the basis of the sensor information will be described as an actual position/posture, and the position/posture information about the actual position/posture will be described as actual position/posture information. In addition, a position and posture estimated on the basis of the position/posture information detected in the past are described as an assumed position/posture, and position/posture information about the assumed position/posture is described as assumed position/posture information.

1-2. Configuration of Terminal

Figure 4:
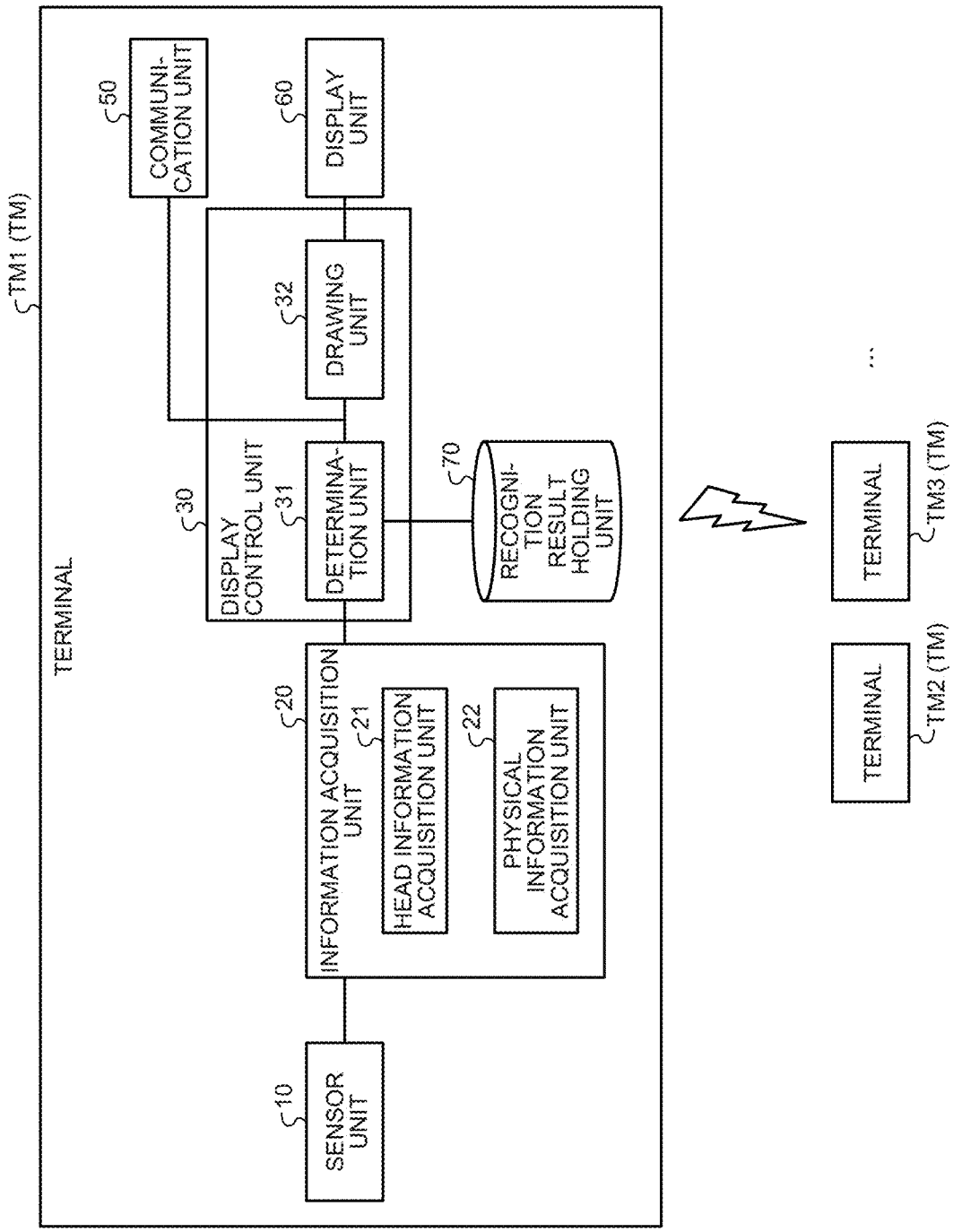
FIG. 4 is a diagram illustrating an example of a configuration of a terminal.

FIG. 4 is a diagram illustrating an example of a configuration of the terminal TM.

The terminal TM is an information processing device that processes various information on the basis of the sensor information. The terminal TM includes, for example, the sensor unit 10, an information acquisition unit 20, a display control unit 30, a communication unit 50, the display unit 60, and a recognition result holding unit 70.

The sensor unit 10 includes various sensors for external sensing. The sensor unit 10 includes the camera CM such as a monocular camera and a stereo camera. The sensor unit 10 is configured to use different cameras CM for different applications such as localization, object detection, and capturing an external image for presentation to the user U. For example, to improve accuracy in external recognition and reduce the delay of the system, the sensor unit 10 can include an inertial sensor (acceleration sensor and gyroscope sensor), a global positioning system (GPS), an ultrasonic sensor, and a distance measurement sensor.

The information acquisition unit 20 performs spatial recognition processing on the basis of the sensor information. The spatial recognition processing is performed for object detection and localization. The spatial recognition processing is performed for each frame of the camera CM.

The spatial recognition processing is performed using a known technology such as simultaneous localization and mapping (SLAM). The spatial recognition processing may be performed using a general-purpose central processing unit (CPU) or graphics processing unit (GPU), or may be performed using a processor specialized for image processing or machine learning processing.

The information acquisition unit 20 includes a head information acquisition unit 21 and a physical information acquisition unit 22. The head information acquisition unit 21 acquires the actual position/posture of the terminal TM on the basis of the localization. The actual position/posture of the terminal TM represents an actual position/posture of the head HD on which the terminal TM is mounted. The physical information acquisition unit 22 acquires an actual position/posture of a portion of the body of the user U other than the head HD, on the basis of the object detection. In the present disclosure, the actual position/posture of the hand HD of the user U is acquired as the portion of the body, but the actual position/posture of a portion of an arm of the user U or the like may be acquired in addition to the hand HD. The information acquisition unit 20 sequentially outputs the actual position/posture information of the hand HN and head HD of the user U obtained by the spatial recognition processing to the display control unit 30.

The display control unit 30 determines the positions and postures of the hand HN and the head HD of the user U, and controls display on the display unit 60 on the basis of a result of the determination. For example, in a tracking period in which the actual position/posture of the hand HN is acquired by the physical information acquisition unit 22, the display control unit 30 controls the display of the virtual object VOB corresponding to the hand HN, on the basis of the actual positions/postures of the hand HN and the head HD. In a restoration waiting period until the actual position/posture of the hand HN is acquired next by the physical information acquisition unit 22 after the temporary failure in detection of the hand HN in the physical information acquisition unit 22, the display control unit 30 controls the display of the virtual object VOB corresponding to the hand HN on the basis of a history of the actual position/posture of the hand HN and on the basis of the actual position/posture of the head HD. The history of the actual position/posture means time-series actual position/posture information acquired in the past, or the temporal change of the actual position/posture that is grasped on the basis of the time-series position information.

For example, the display control unit 30 includes a determination unit 31 and a drawing unit 32.

The determination unit 31 determines the position and posture of the hand HN during the restoration waiting period in which detection of the hand HN has failed, on the basis of the history of the actual position/posture of the hand HN immediately before the beginning of the failure in detection of the hand HN. Unlike the object detection, the actual position/posture of the head HD is reliably acquired on the basis of the sensor information. The determination unit 31 determines the actual position/posture acquired by the head information acquisition unit 21 as the position and posture of the head HD directly, and generates the position/posture information of the head HD. The determination unit 31 sequentially outputs the position/posture information of the hand HN obtained by the determination to the drawing unit 32 and the communication unit 50, together with the actual position/posture information of the head HD acquired from the head information acquisition unit 21.

In the tracking period in which the hand HN is successfully detected, the determination unit 31 determines the actual positions/postures of the hand HN and the head HD, as the positions and postures of the hand HN and the head HD. The determination unit 31 sequentially outputs the actual position/posture information of the hand HN and head HD acquired from the information acquisition unit 20 to the drawing unit 32 and the communication unit 50, as the position/posture information of the hand HN and head HD. In addition, the determination unit 31 sequentially outputs the actual position/posture information of the hand HN acquired from the physical information acquisition unit 22 to the recognition result holding unit 70.

The recognition result holding unit 70 stores the actual position/posture information of the hand HN output from the determination unit 31. The actual position/posture information of the hand HN generated by the information acquisition unit 20 is sequentially input to the recognition result holding unit 70 via the determination unit 31. The recognition result holding unit 70 holds only the actual position/posture information of the hand HN at a plurality of the latest time points, of the actual position/posture information of the hand HN sequentially input from the determination unit 31, as results of the latest recognition of the hand HN. The recognition result holding unit 70 holds only the actual position/posture information, and does not hold the assumed position/posture information. The determination unit 31 determines the position and posture of the hand HN in the restoration waiting period, on the basis of the actual position/posture information of the hand HN held in the recognition result holding unit 70.

The communication unit 50 sequentially transmits the actual position/posture information and the assumed position/posture information that are output from the determination unit 31 to another terminal TM. The communication unit 50 outputs the actual position/posture information and assumed position/posture information of another user U that are transmitted from the another terminal TM to the drawing unit 32. A communication method may use wireless communication or wired communication.

The drawing unit 32 generates the avatar AB of the user U of the terminal itself on the basis of the actual position/posture information and the assumed position/posture information that are input from the determination unit 31 of the terminal itself. The drawing unit 32 generates the avatar AB of the user U of the another terminal TM on the basis of the actual position/posture information and the assumed position/posture information that are input from the another terminal TM via the communication unit 50. GPU is often used for drawing, but CPU may be used.

The display unit 60 displays the avatars AB of the user U of the terminal itself and user U of the another terminal TM that are generated by the drawing unit 32. When the avatars AB are superimposed and displayed in the real space RSP, the display unit 60 also displays the video of the real space RSP captured by the camera CM. As the display unit 60, a liquid crystal display (LCD) panel, an organic light-rmitting diode (OLED) panel, or the like is used.

1-3. Transition of Detection State

Figure 5:
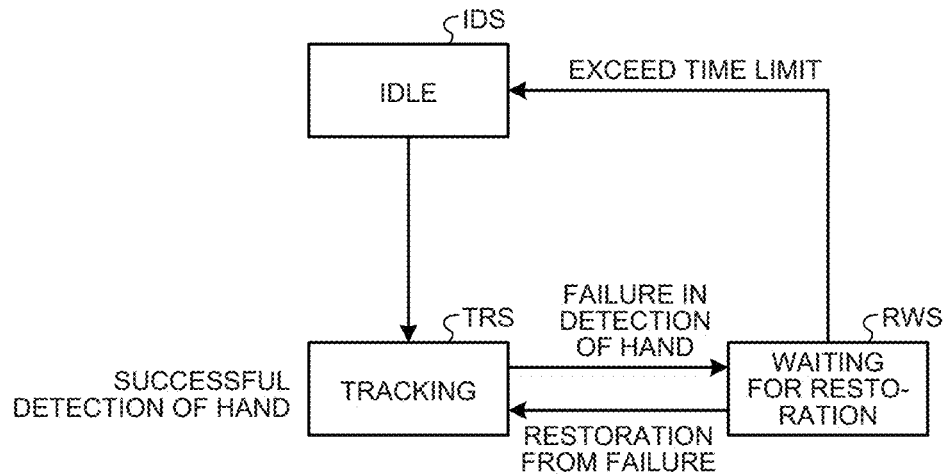
FIG. 5 is a diagram illustrating transition of a detection state.

FIG. 5 is a diagram illustrating transition of a detection state.

An IDLE state is a state in which the information acquisition unit 20 attempts to detect the hand HN but does not detect the hand HN yet. A tracking state is a state in which the hand HN has been successfully detected upon previous attempt of the detection. A restoration waiting state is a state in which the detection of the hand HN has failed, not running over a preset time limit from the beginning of the failure.

The IDLE state includes a long error state in which a time from the beginning of the failure in detection of the hand HN exceeds the time limit, and a non-estimable state in which the position and posture of the hand HN cannot be appropriately estimated on the basis of the history of the actual position/posture of the hand HN. The non-estimable state includes a state in which the result of the estimation has a failure and a state in which a change in past actual position/posture grasped on the basis of the history of the actual position/posture of the hand HN is beyond an allowable range, preventing appropriate estimation of the position and posture of the hand HN. The long error state and the restoration waiting state both represent a state in which the detection has failed upon the previous attempt of the detection, but are distinguished by an elapsed time from the beginning of failure in the detection.

In the present disclosure, a period during which the IDLE state continues, a period during which the tracking state continues, and a period during which the restoration waiting state continues are referred to as IDLE period, tracking period, and restoration waiting period, respectively.

In the IDLE period, it is highly likely that the position and posture of the hand HN cannot be estimated appropriately on the basis of the history of the actual position/posture of the hand HN. For example, in the long error state, the detection of the hand HN has continuously failed for a long time, which suggests the possibility that the position and posture of the hand HN may be changed greater than expected. In the non-estimable state, appropriate estimation cannot be performed or the result of the estimation has a failure. Therefore, in the IDLE period, the determination unit 31 does not estimate the position and posture of the hand HN. The determination unit 31 stops the estimation of the position and posture of the hand HN until the hand HN is successfully detected next. The determination unit 31 does not transmit the position/posture information of the hand HN to the another terminal TM or transmits default position/posture information of the hand HN to the another terminal TM. The drawing unit 32 stops display of the virtual object VOB corresponding to the hand HN until the hand HN is successfully detected next.

In the IDLE period, the determination unit 31 may transmit information (failure information) indicating the failure in the detection of the hand HN to the another terminal TM. In the another terminal TM, upon acquisition of the failure information, the user U of the another terminal TM can be notified of the failure information by pop-up display or the like.

In the tracking period, the information acquisition unit 20 generates the actual position/posture information of the hand HN. The determination unit 31 determines the actual position/posture of the hand HN as the position and posture of the hand HN, and transmits the actual position/posture information of the hand HN to the another terminal TM. The drawing unit 32 controls the display of the virtual object VOB corresponding to the hand HN on the basis of the actual position/posture of the hand HN.

In the restoration waiting period, the determination unit 31 estimates the position and posture of the hand HN on the basis of the history of the actual position/posture of the hand HN immediately before the beginning of the failure in detection of the hand HN and on the basis of the actual position/posture of the head HD. The determination unit 31 generates the assumed position/posture information on the basis of results of the estimation of the position and posture of the hand HN, and transmits the assumed position/posture information to the another terminal TM. The determination unit 31 controls the display of the virtual object VOB corresponding to the hand HN on the basis of the assumed position/posture of the hand HN.

Note that the determination unit 31 may adjust the length of the time limit according to a magnitude of the change in the past actual position/posture of the hand HN, detected on the basis of the history of the actual position/posture of the hand HN. For example, the determination unit 31 detects the magnitude of the change in the actual position/posture of the hand HN immediately before the beginning of the failure in detection of the hand HN, as the magnitude of the change in the past actual position/posture of the hand HN, on the basis of the actual position/posture information of the hand HN at a plurality of time points held in the recognition result holding unit 70. The determination unit 31 sets the time limit longer as the change in the actual position/posture of the hand HN is larger. However, the time limit may not be adjusted, in a case where the failure in the detection is caused temporary and is expected not to continue for a long time, such as failure in the detection mainly caused on the basis of a problem in image processing (e.g., influence of light, etc.) instead of the movement of the field of view FV.

1-4. Information Processing Method

Hereinafter, an example of information processing in the determination unit 31 will be described with reference to FIGS. 6 and 7.

Figure 6:
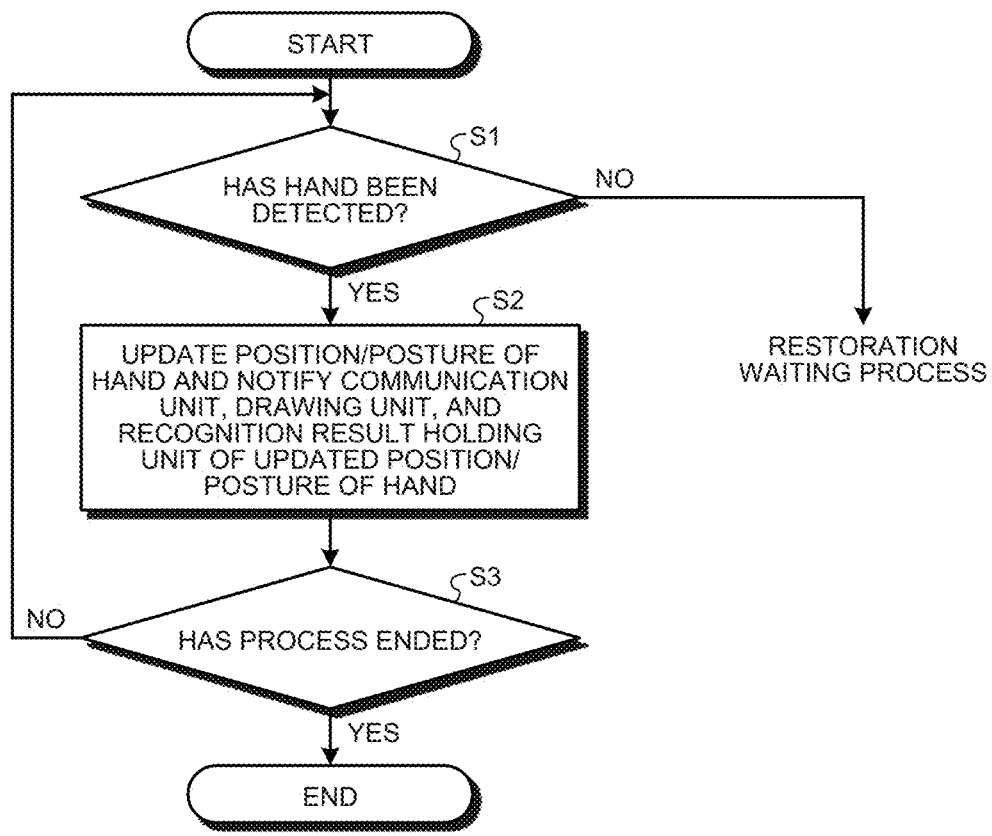
FIG. 6 is a flowchart illustrating an example of a process performed in a tracking state.

FIG. 6 is a flowchart illustrating an example of a process performed in the tracking state.

In Step S1, the determination unit 31 determines whether the information acquisition unit 20 has successfully detected the hand HN. For example, when the actual position/posture information of the hand HN is acquired from the information acquisition unit 20, the determination unit 31 determines that the hand HN has been successfully detected. When no actual position/posture information of the hand HN is acquired from the information acquisition unit 20, the determination unit 31 determines that the detection of the hand HN has failed.

In Step S1, when it is determined that the hand HN has been successfully detected (Step S1: Yes), the process proceeds to Step S2. In Step S2, the determination unit 31 determines the actual position/posture of the hand HN acquired from the information acquisition unit 20, as the current position and posture of the hand HN. The determination unit 31 outputs the actual position/posture information of the hand HN to the drawing unit 32, the communication unit 50, and the recognition result holding unit 70. The drawing unit 32 controls the display of the virtual object OB corresponding to the hand HN, on the basis of the determined position and posture of the hand HN. Then, in Step S3, the determination unit 31 performs end determination, and repeats the above-described processing until an end flag such as an end operation by the user U is detected.

In Step S1, when it is determined that the detection of the hand HN has failed (Step S1: No), the determination unit 31 performs a restoration waiting process which is described later.

Figure 7:
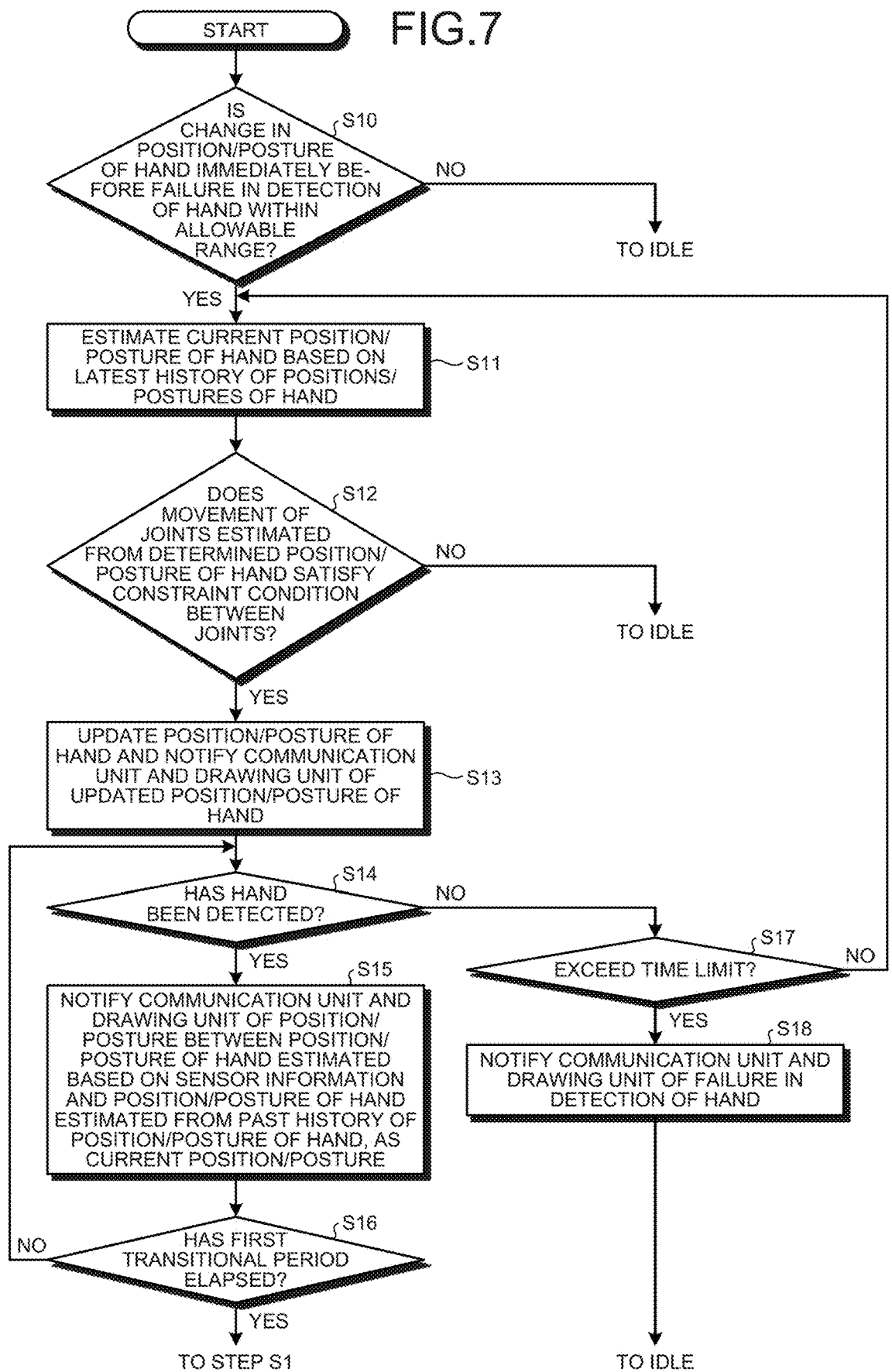
FIG. 7 is a diagram illustrating an example of a process in a restoration waiting period.

FIG. 7 is a diagram illustrating an example of a process in the restoration waiting period. FIG. 8 is a diagram illustrating a process performed in transition from the tracking state to the restoration waiting state.

In Step S10, the determination unit 31 determines whether the change in the actual position/posture of the hand HN immediately before the beginning of the failure in detection of the hand HN is within the allowable range.

For example, the determination unit 31 acquires, from the recognition result holding unit 70, the actual position/posture information of the hand HN at a plurality of time points immediately before the beginning of the failure in detection of the hand HN. As illustrated in FIG. 8, the determination unit 31 calculates a moving speed and a posture change speed of the hand HN immediately before the beginning of the failure in detection of the hand HN, on the basis of the actual positions/postures PSA of the hand HN at a plurality of time points. When the moving speed and the posture change speed of the hand HN satisfy preset criteria, the determination unit 31 determines that change in the actual positions/postures PSA is within the allowable range. In the example of FIG. 8, as the actual positions/postures PSA, actual positions/postures PSA1 to PSA3 at three time points are illustrated in a chronological order, but the number of the actual positions/postures PSA to be calculated is not limited to three.

In Step S10, when it is determined that the change in the actual positions/postures PSA exceeds the allowable range (Step S10: No), the detection state of the hand HN transitions to the IDLE state. The determination unit 31 does not estimate the position and posture of the hand HN. The drawing unit 32 stops the display of the virtual object VOB corresponding to the hand HN until the hand HN is successfully detected.

In Step S10, when it is determined that the change in the actual positions/postures PSA is within the allowable range (Step S10: Yes), the process proceeds to Step S11. In Step S11, the determination unit 31 estimates the current position and posture of the hand HN on the basis of the latest history of the actual positions/postures PSA of the hand HN. For example, as illustrated in FIG. 8, the determination unit 31 calculates, as an assumed position/posture PSE, the current position and posture of the hand HN, assuming that the position and posture of the hand HN have changed up to the present at the moving speed and the posture change speed of the hand HN obtained in Step S10. The determination unit 31 estimates the assumed position/posture PSE of the hand HN obtained by calculation, as the current position and posture of the hand HN.

In Step S12, the determination unit 31 estimates movement of the joints of the user U from the assumed position/posture PSE of the hand HN, on the basis of inverse kinematics (IK). The determination unit 31 determines whether the estimated movement of the joints satisfies a constraint condition between the joints.

When it is determined that the movement of the joints satisfies the constraint condition between the joints in Step S12 (Step S12: Yes), the process proceeds to Step S13. In Step S13, the determination unit 31 outputs the assumed position/posture information about the assumed position/posture PSE to the drawing unit 32 and the communication unit 50. In Step S12, when it is determined that the movement of the joints does not satisfy the constraint condition between the joints (Step S12: No), the detection state of the hand HN transitions to the IDLE state. The determination unit 31 rejects the results of the estimation of the position and posture of the hand HN, and stops the estimation of the position and posture of the hand HN until the hand HN is successfully detected. The drawing unit 32 stops the display of the virtual object VOB corresponding to the hand HN until the hand HN is successfully detected.

IK is a general technology of specifying a start point, an end point, and a target point for a certain joint group to obtain the positions and postures of joints between the start point, the end point, and the target point by complementary calculation. As illustrated in FIG. 8, the hand HN is connected to the head HD via joints. Therefore, there is a constraint condition based on a human body structure, between the hand HN and the head HD.

For example, the determination unit 31 sets an actual position/posture PSA of the hand HN detected by the physical information acquisition unit 22 last time, as the end point, sets an actual position/posture of the head HD detected by the head information acquisition unit 21 at the same time point as the last time, as the start point, and sets the assumed position/posture PSE of the hand HN estimated by the determination unit 31 this time, as the target point. In the process of moving the end point to the target point, when the movement of the end point to the target point exceeds restriction of the rotation angle of each joint set in advance or exceeds a maximum distance between the start point and the end point, the determination unit 31 determines that a relationship between the assumed position/posture PSE of the hand HN, and the actual position/posture of the head HD detected by the information acquisition unit 20 has a failure, and rejects the result of the estimation. When the result of the estimation is not rejected, the determination unit 31 determines that the assumed position/posture PSE is appropriate. The determination unit 31 determines the assumed position/posture PSE as the current position and posture of the hand HN, and notifies the drawing unit 32 and the communication unit 50 of the assumed position/posture PSE.

When the assumed position/posture information is output to the drawing unit 32 and the communication unit 50 in Step S13, the determination unit 31 determines whether the hand HN has been detected, in Step S14. For example, when the actual position/posture information of the hand HN is acquired from the information acquisition unit 20, the determination unit 31 determines that the hand HN has been successfully detected. When no actual position/posture information of the hand HN is acquired from the information acquisition unit 20, the determination unit 31 determines that the detection of the hand HN has failed.

In Step S14, when it is determined that the hand HN has been successfully detected (Step S14: Yes), the process proceeds to Step S15. In Step S15, the determination unit 31 performs transition processing for transition to a normal tracking process.

When the hand HN is successfully detected, the detection state of the hand HN transitions to the tracking state. As described in Step S2, in the tracking state, the actual position/posture PSA detected on the basis of the sensor information is directly used as the position and posture of the hand HN. However, if the actual position/posture PSA is directly adopted, a significant difference from a preceding assumed position/posture PSE may be caused due to an error in the position and posture accumulated during the restoration waiting period. Therefore, the determination unit 31 sets a predetermined period immediately after returning to the detection of the hand HN, as a first transitional period, and gradually reduces the difference described above in the first transitional period.

For example, in the first transitional period, the determination unit 31 determines, as the current position and posture of the hand HN, an intermediate position/posture PSM (see FIG. 9) between a current actual position/posture PSA of the hand HN based on the sensor information acquired by the physical information acquisition unit 22 and the current assumed position/posture PSE of the hand HN estimated based on the past history of the actual positions/postures PSA of the hand HN. The determination unit 31 outputs the current assumed position/posture information of the hand HN obtained by the determination to the drawing unit 32 and the communication unit 50. The drawing unit 32 controls the display of the virtual object VOB corresponding to the hand HN on the basis of the determined intermediate position/posture PSM.

In Step S16, the determination unit 31 determines whether the first transitional period has elapsed. In Step S16, when it is determined that the first transitional period has elapsed (Step S16: Yes), the process proceeds to Step S1, and the determination unit 31 performs a normal process performed in the tracking state. In a period before the detection of the object OB fails again after the first transitional period has elapsed, the determination unit 31 determines the actual position/posture PSA of the hand HN detected on the basis of the sensor information, as the position and posture of the hand HN.

In Step S16, when it is determined that the first transitional period has not elapsed (Step S16: No), the process returns to Step S14, and the transition processing from Step S14 to Step S16 is continued until the first transitional period ends.

Figure 9:
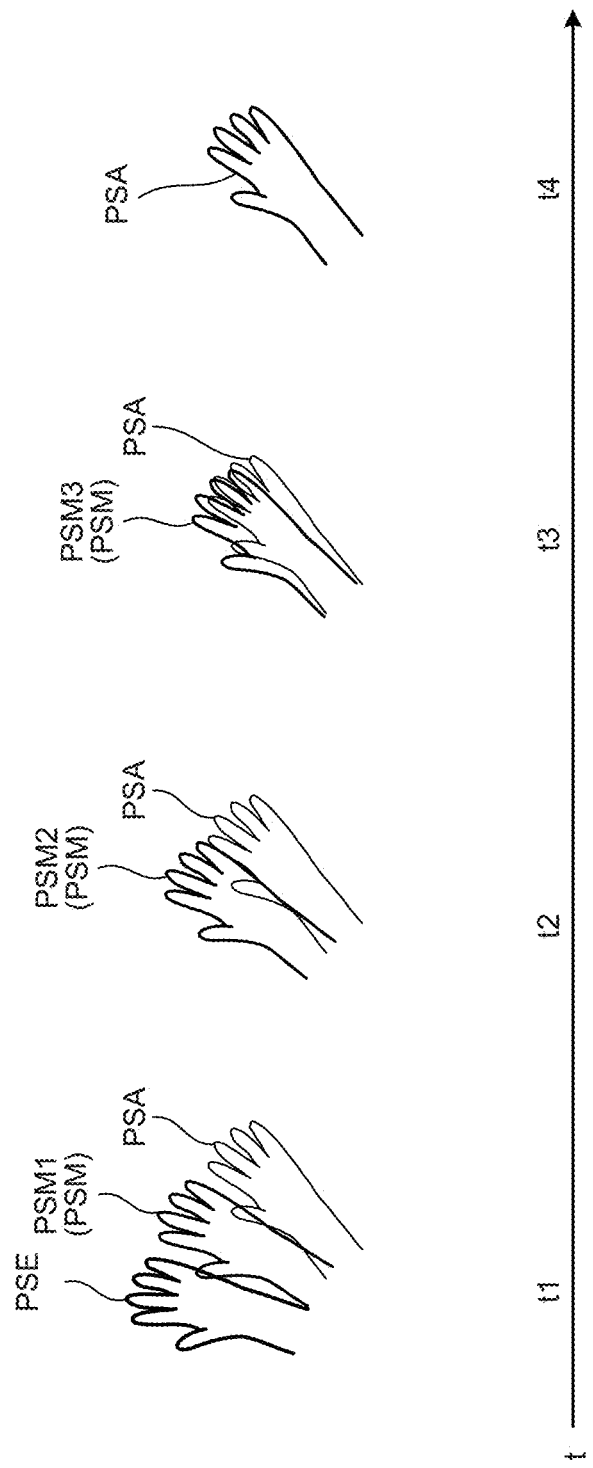
FIG. 9 is a diagram illustrating an example of transition processing in a first transitional period.

FIG. 9 is a diagram illustrating an example of the transition processing in the first transitional period.

Time point t1 indicates a time point at which the detection of the object OB is restored. The determination unit 31 sets a period from time point t1 to time point t3 as the first transitional period.

At time point t1, the determination unit 31 estimates the assumed position/posture PSE of the hand HN at time point t1 on the basis of the past history of the actual position/posture of the hand HN. For example, the determination unit 31 calculates, as the assumed position/posture PSE at time point t1, the position and posture of the hand HN at time point t1, assuming that the position and posture of the hand HN have changed up to time point t1 at the moving speed and the posture change speed of the hand HN obtained in Step S4. The determination unit 31 acquires the actual position/posture information at time point t1 generated on the basis of the sensor information at time point t1, from the information acquisition unit 20. The determination unit 31 determines, as the position and posture of the hand HN at time point t1, an intermediate position/posture PSM1 between the actual position/posture PSA at time point t1 indicated by the actual position/posture information at time point t1 and the assumed position/posture PSE at time point t1 that is calculated on the basis of the past history of the actual position/posture.

At time point t2, the determination unit 31 acquires the actual position/posture information at time point t2 generated on the basis of the sensor information at time point t2, from the information acquisition unit 20. The determination unit 31 determines, as the position and posture of the hand HN at time point t2, an intermediate position/posture PSM2 between the actual position/posture PSA at time point t2 indicated by the actual position/posture information at time point t2 and the intermediate position/posture PSM1 at time point t1 obtained by the determination at time point t1.

At time point t3, the determination unit 31 acquires the actual position/posture information at time point t3 generated on the basis of the sensor information at time point t3, from the information acquisition unit 20. The determination unit 31 determines, as the position and posture of the hand HN at time point t3, an intermediate position/posture PSM3 between the actual position/posture PSA at time point t3 indicated by the actual position/posture information at time point t3 and the intermediate position/posture PSM2 at time point t2 obtained by the determination at time point t2.

After time point t4, the determination unit 31 directly uses the actual position/posture PSA indicated by the actual position/posture information, as the position and posture of the hand HN.

Returning to FIG. 7, in Step S14, when it is determined that the detection of the hand HN has failed (Step S14: No), the process proceeds to Step S17. In Step S17, the determination unit 31 determines whether duration of the failure in detection of the hand HN exceeds the preset time limit.

In Step S17, when it is determined that the duration of the failure exceeds the time limit (Step S17: Yes), the process proceeds to Step S18. In Step S18, the determination unit 31 notifies the drawing unit 32 and the communication unit 50 of the failure in detection of the hand HN. The detection state of the hand HN transitions to the IDLE state. The determination unit 31 stops the determination of the position and posture of the hand HN until the hand HN is successfully detected. The drawing unit 32 stops the display of the virtual object VOB corresponding to the hand HN until the hand HN is successfully detected. In Step S17, when it is determined that the duration of the failure does not exceed the time limit (Step S17: No), the process returns to Step S11.

1-5. Exemplary Hardware Configuration

Figure 10:
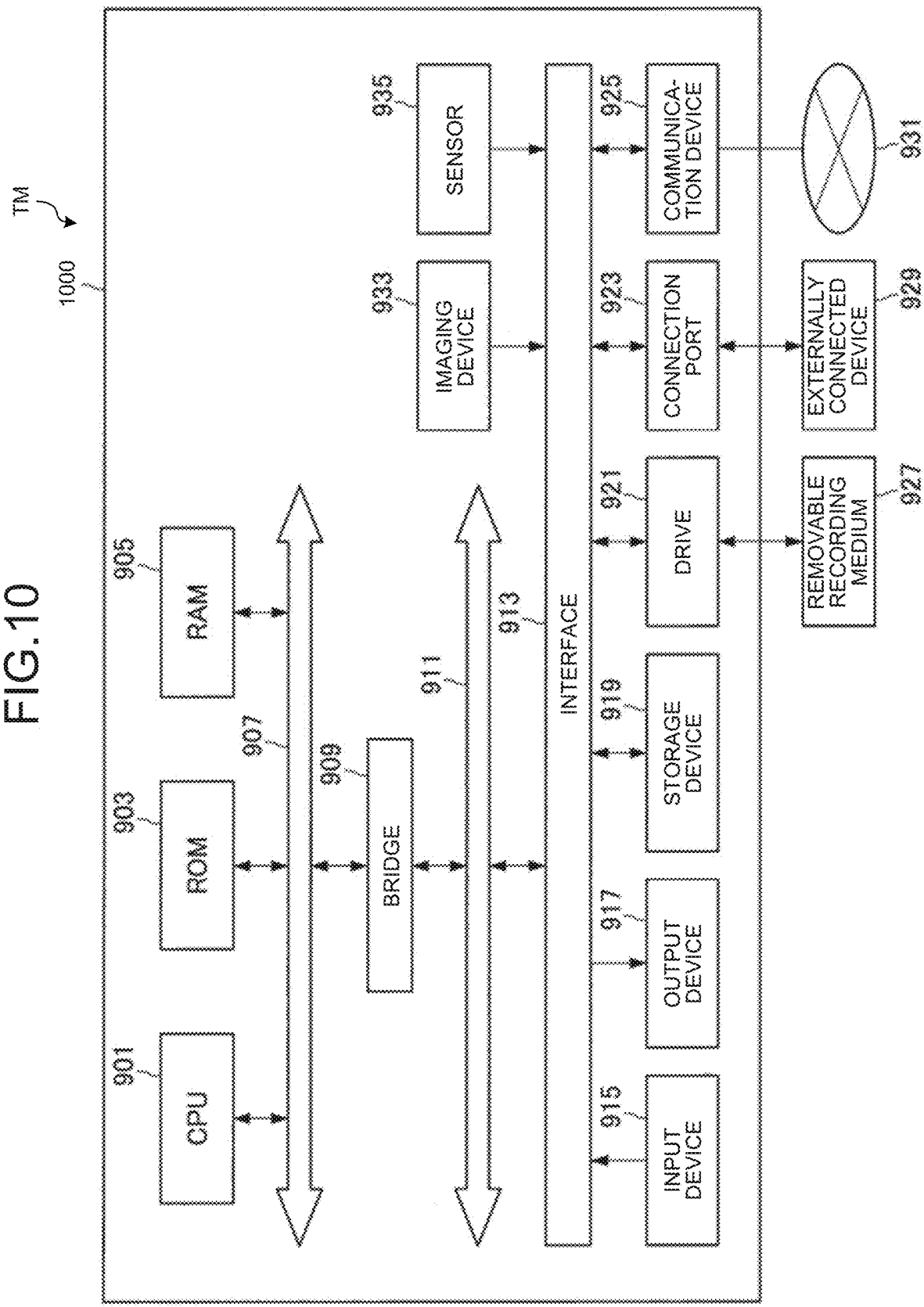
FIG. 10 is a diagram illustrating an example of a hardware configuration of the terminal.

FIG. 10 is a diagram illustrating an example of a hardware configuration of the terminal TM.

The terminal TM includes a computer 1000 as illustrated in FIG. 10. The computer 1000 includes a central processing unit (CPU) 901, a read only memory (ROM) 903, and a random access memory (RAM) 905. Furthermore, the computer 1000 may include a host bus 907, a bridge 909, an external bus 911, an interface 913, an input device 915, an output device 917, a storage device 919, a drive 921, a connection port 923, and a communication device 925. Furthermore, the computer 1000 may include an imaging device 933 and a sensor 935 as necessary. The computer 1000 may include a processing circuit called a digital signal processor (DSP) or application specific integrated circuit (ASIC), in place of or in combination with the CPU 901.

The CPU 901 functions as an arithmetic processing unit and a control device, and controls all or part of the operation in the computer 1000, according to various programs recorded in the ROM 903, the RAM 905, the storage device 919, or a removable recording medium 927. The ROM 903 stores a program, calculation parameter, and the like used by the CPU 901. The RAM 905 temporarily stores the program used in execution of the CPU 901, and the parameter and the like that change appropriately in the execution of the programs. The CPU 901, ROM 903, and RAM 905 are connected to each other by the host bus 907 including an internal bus such as a CPU bus. Furthermore, the host bus 907 is connected to the external bus 911 such as a peripheral component interconnect/interface (PCI) bus via the bridge 909.

The input device 915 is a device, such as a mouse, keyboard, touch panel, button, switch, or lever, operated by the user. The input device 915 may include a microphone to detect user's voice. The input device 915 may be, for example, a remote control device using infrared rays or other radio waves, or an externally connected device 929 such as a mobile phone operable according to the operation of the computer 1000. The input device 915 includes an input control circuit that generates an input signal on the basis of information input by the user and outputs the input signal to the CPU 901. The user operates the input device 915 to input various data to the computer 1000 or give an instruction for processing operation. Furthermore, the imaging device 933, which is described later, also functions as an input device by imaging the movement of a user's hand, user's finger, or the like. At this time, a pointing position may be determined according to the movement of the hand or the direction of the finger.

The output device 917 includes a device configured to visually or audibly notify the user of information acquired. The output device 917 may be, for example, a display device such as a liquid crystal display (LCD), plasma display panel (PDP), organic electro-luminescence (EL) display, or projector, a hologram display device, a sound output device such as a speaker or headphones, a printer device, or the like. The output device 917 outputs a result of processing by the computer 1000, as an image such as a text or video, or as sound such as voice or acoustic sound. Furthermore, the output device 917 may include a light or the like to illuminate the surroundings.

The storage device 919 is a data storage device configured as an example of a storage unit of the computer 1000. The storage device 919 includes, for example, a magnetic storage device such as a hard disk drive (HDD), a semiconductor storage device, an optical storage device, a magneto-optical storage device, or the like. The storage device 919 also stores the program and various data for execution by the CPU 901, various data acquired from outside, and the like.

The drive 921 is a reader/writer for the removable recording medium 927 such as a magnetic disk, optical disk, magneto-optical disk, or semiconductor memory, and is built in or externally mounted to the computer 1000. The drive 921 reads information recorded in the removable recording medium 927 mounted, and outputs the information to the RAM 905. In addition, the drive 921 writes a record in the removable recording medium 927 mounted.

The connection port 923 is a port configured to directly connect a device to the computer 1000. The connection port 923 may be, for example, a universal serial bus (USB) port, an IEEE1394 port, a small computer system interface (SCSI) port, or the like. Furthermore, the connection port 923 may be an RS-232C port, an optical audio terminal, a high-definition multimedia interface (HDMI) (registered trademark) port, or the like. Connecting the externally connected device 929 to the connection port 923 makes it possible to exchange various data between the computer 1000 and the externally connected device 929.

The communication device 925 is a communication interface that includes, for example, a communication device or the like for connection to a communication network 931. The communication device 925 may be, for example, a wired or wireless local area network (LAN), Bluetooth (registered trademark), a communication card for a wireless USB (WUSB), or the like. Furthermore, the communication device 925 may be a router for optical communication, a router for an asymmetric digital subscriber line (ADSL), a modem for various communications, or the like. For example, the communication device 925 transmits/receives signals and the like to and from the Internet or another communication device by using a predetermined protocol such as TCP/IP. Furthermore, the communication network 931 connected to the communication device 925 is a network that is connected in a wired or wireless manner, including, for example, the Internet, a home LAN, infrared communication, radio wave communication, or satellite communication.

The imaging device 933 is a device that uses, for example, an imaging element such as a charge coupled device (CCD) or complementary metal oxide semiconductor (CMOS), and various members such as a lens for controlling formation of an object image on the imaging element to image the real space, generating a captured image. The imaging device 933 may be a device that captures a still image or a device that captures a moving image.

The sensor 935 is, for example, various sensors such as a distance measuring sensor, acceleration sensor, gyroscope sensor, geomagnetic sensor, optical sensor, and sound sensor. The sensor 935 acquires information about a state of the computer 1000 itself such as a posture of a housing of the computer 1000, or information about the surrounding environment of the computer 1000 such as brightness, noise, and the like around the computer 1000. Furthermore, the sensor 935 may also include a GPS sensor that receives a global positioning system (GPS) signal to measure the latitude, longitude, and altitude of the device.

1-6. Effects

The terminal TM includes the head information acquisition unit 21, the physical information acquisition unit 22, and the display control unit 30. The head information acquisition unit 21 acquires the position and posture of the head HD of the user U. The physical information acquisition unit 22 acquires the position and posture of the hand HN of the user U. In the restoration waiting period until the position and posture of the hand HN is acquired next by the physical information acquisition unit 22 after the failure in detection of the hand HN, the display control unit 30 controls the display of the virtual object VOB corresponding to the hand HN, on the basis of the history of the actual position/posture of the hand HN and on the basis of the actual position/posture of the head HD. In the information processing method of the present embodiment, the processing of the terminal TM described above is executed by the computer 1000. The program of the present embodiment causes the computer 1000 to implement the above processing of the terminal TM.

This configuration suppresses sudden interruption of the drawing of the hand HN, even when the detection of the hand HN has failed.

The display control unit 30 estimates the position and posture of the hand HN on the basis of the history of the actual position/posture of the hand HN and on the basis of the actual position/posture of the head HD, and controls the display of the virtual object VOB corresponding to the hand HN on the basis of the result of the estimation. The display control unit 30 detects the change in the actual position/posture of the hand HN on the basis of the history of the actual position/posture of the hand HN. When the detected change in the actual position/posture is beyond the allowable range, the display control unit 30 stops the display of the virtual object VOB corresponding to the hand HN without estimating the position and posture of the hand HN.

This configuration suppresses making a determination having a significant difference from the actual position and posture of the hand HN. It is difficult to accurately predict the position and posture of the hand HN whose position and posture are being greatly changed. In such a case, forcible determination of the position and posture may provide an unnatural result. Stopping the determination can provide a natural result.

The display control unit 30 estimates the movement of the joints of the user U from the estimated position and posture of the hand HN, on the basis of IK. When the estimated movement of the joints does not satisfy the constraint condition between the joints, the display control unit 30 rejects the results of the estimation of the position and posture of the hand HN and stops the display of the virtual object VOB corresponding to the hand HN.

This configuration suppresses unnatural determination against the constraint condition between the joints.

When the restoration waiting period until the actual position/posture of the hand HN is acquired by the physical information acquisition unit 22 exceeds the preset time limit, the display control unit 30 stops the display of the virtual object VOB corresponding to the hand HN.

This configuration suppresses wrong results of the determination due to the accumulation of errors in the determination.

The display control unit 30 adjusts the length of the time limit according to the magnitude of the change in the past actual position/posture of the hand HN detected on the basis of the history of the actual position/posture of the hand HN.

This configuration flexibly adjusts the time limit according to the change in the position and posture immediately before the beginning of the failure in detection. Therefore, a more appropriate result of the determination of the position and posture in the restoration waiting period is provided.

When the state of the failure in detection of the hand HN transitions to the state of the success in the detection, the display control unit 30 determines the position and posture of the hand HN in the first transitional period immediately after returning to the detection of the hand HN by the transition, as the intermediate position/posture PSM between the actual position/posture PSA of the hand HN acquired by the physical information acquisition unit 22 and the assumed position/posture PSE of the hand HN estimated on the basis of the history of the actual position/posture of the hand HN, and controls the display of the virtual object VOB corresponding to the hand HN on the basis of the determined position and posture.

This configuration makes it possible to gradually reduce the error in the position and posture accumulated in the restoration waiting period in the first transitional period.

The display control unit 30 determines the position and posture of the hand HN after the first transitional period has elapsed, as the actual position/posture PSA acquired by the physical information acquisition unit 22, and controls the display of the virtual object VOB corresponding to the hand HN on the basis of the determined position and posture.

This configuration smoothly changes the position/posture PS during the first transitional period to the position/posture PS after the end of the first transitional period. Therefore, enhanced continuity of the position and posture after restoration from the failure is provided.

Note that the effects described herein are merely examples and are not limited to the description, and other effects may be provided.

2. Second Embodiment

2-1. Information Processing Method

FIGS. 11 to 15 are diagrams each illustrating an example of information processing according to a second embodiment.

The present embodiment is different from the first embodiment in that a determination method of the present disclosure is applied to an object OB held by the hand HN. When the hand HN grasps the object OB, the display control unit 30 controls the display of the virtual object VOB corresponding to the object OB. in the restoration waiting period until a position and posture of the object OB are acquired, on the basis of a history of the position and posture of the object OB. When the hand HN does not grasp the object OB, the display control unit 30 stops displaying the virtual object VOB corresponding to the object OB. Hereinafter, differences from the first embodiment will be mainly described.

Figure 11:
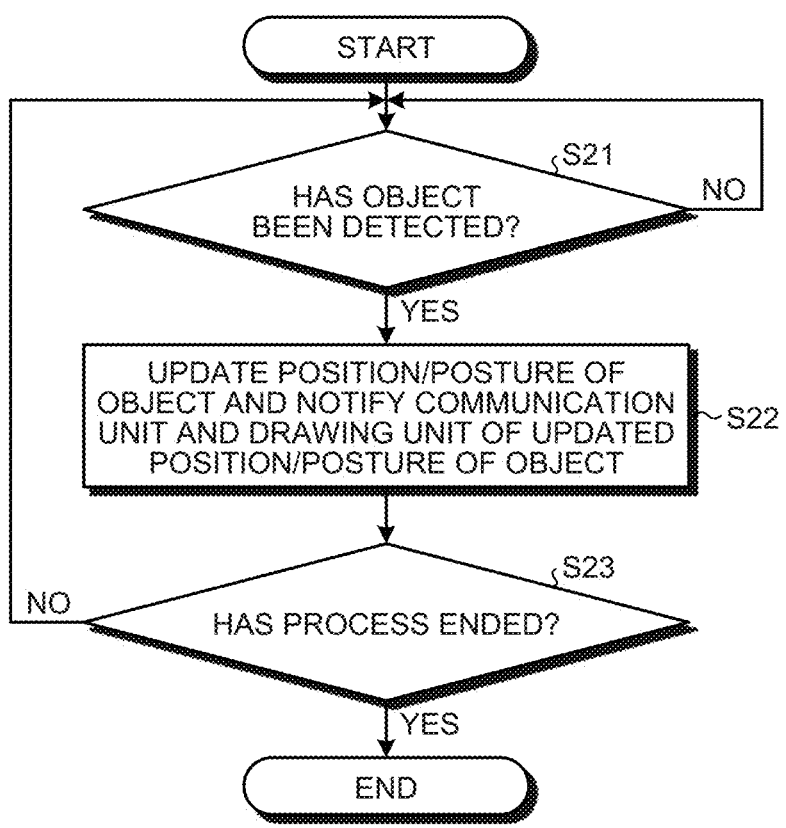
FIG. 11 is a diagram illustrating an example of a detection process for an object arranged independently of a hand.

FIG. 11 is a diagram illustrating an example of a detection process for the object OB arranged independently of the hand HN.

In Step S21, the determination unit 31 determines whether the information acquisition unit 20 has successfully detected the object OB. In Step S21, when it is determined that the object OB has been successfully detected (Step S21: Yes), the process proceeds to Step S22. In Step S22, the determination unit 31 outputs actual position/posture information of the object OB acquired from the information acquisition unit 20 to the drawing unit 32, the communication unit 50, and the recognition result holding unit 70. Then, in Step S23, the determination unit 31 performs the end determination, and repeats the processing described above until the end flag is detected.

In Step S21, when it is determined that the detection of the object OB has failed (Step S21: No), Step S21 is repeated until the object OB is successfully detected. Unlike the hand HN, the object OB has no restriction on a distance to the user U. Accordingly, even if the position and posture upon a failure in detection are determined similarly to the hand HN, the appropriate result of the determination cannot be determined on the basis of IK. Therefore, when the detection of the object OB has failed, a detection state of the object OB directly transitions to the IDLE state.

Figure 12:
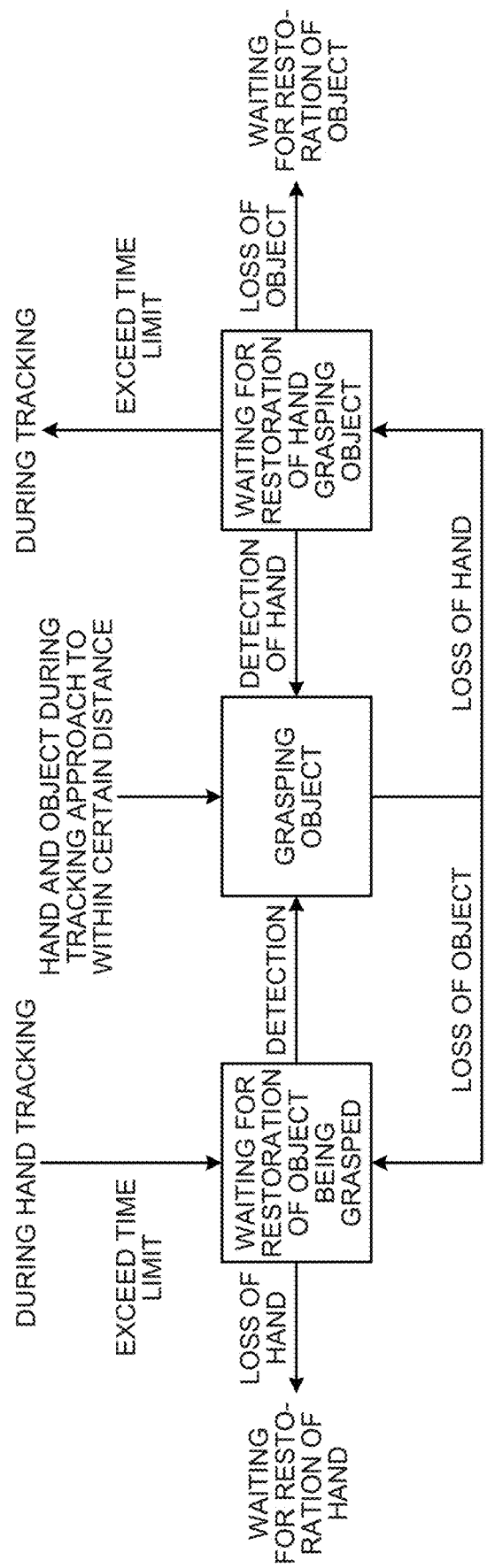
FIG. 12 is a diagram illustrating an example of a detection process for the object where the object is grasped by the hand.

FIG. 12 is a diagram illustrating an example of a detection process for the object OB where the object OB is grasped by the hand HN.

As described above, when the detection of the object OB has failed, the detection state of the object OB transitions not to the restoration waiting state but to the IDLE state. However, when the detection of the object OB has failed while the object OB is grasped by the hand HN, the detection state of the object OB transitions to the restoration waiting state. When both of the detection states of the object OB and the hand HHN are in the tracking state and a distance between the object OB and the hand HN is smaller than a preset threshold, the determination unit 31 determines that the object OB is grasped by the hand HN.

Figure 16:
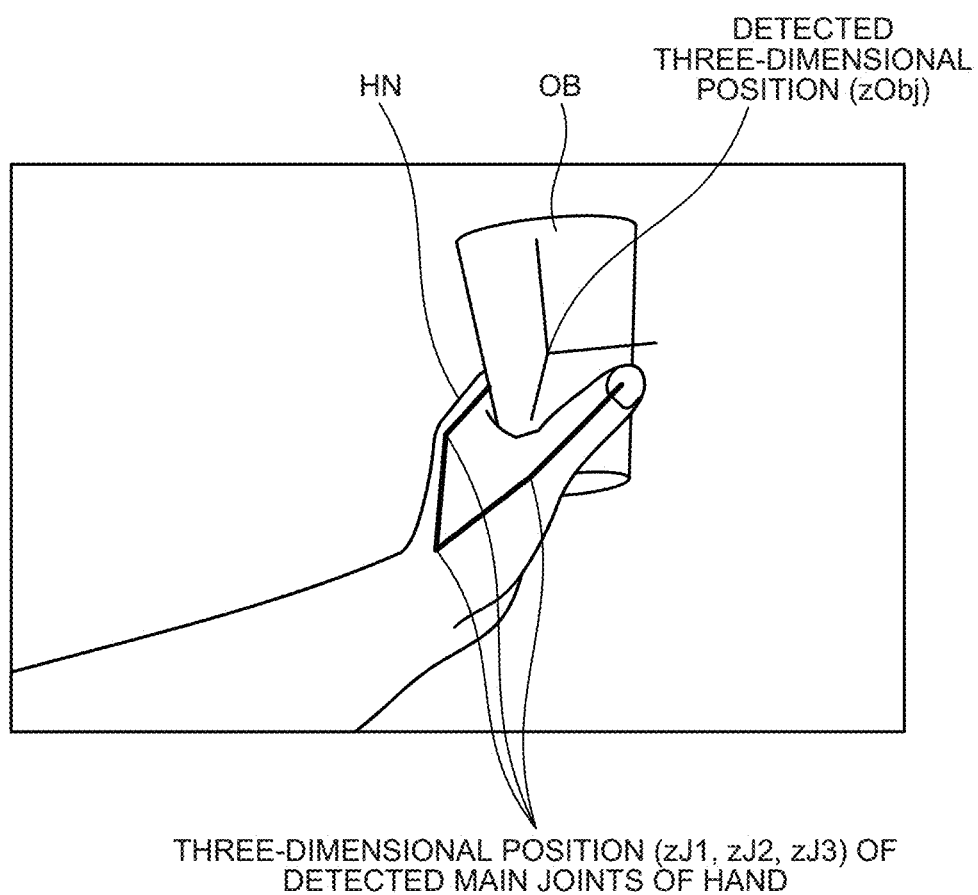
FIG. 16 is a diagram illustrating an example of a method of determining whether the object is grasped by the hand.

FIG. 16 is a diagram illustrating an example of a method of determining whether the object OB is grasped by the hand HN.

It is determined whether the object OB is grasped by the hand HN, from a relationship between an actual position/posture (zObj) of the detected object OB and three joints (zJ1, zJ2, and zJ3) of main joints of the detected hand HN. A calculation example will be described below. In the following formula, "Abs" represents an absolute value, and "threshold" represents a criterion for determining whether the object OB is grasped.

$$\text{threshold} > \frac{\text{Abs}(zJ1 - zObj) + \text{Abs}(zJ2 - zObj) + \text{Abs}(zJ3 - zObj)}{3} \quad (1)$$

Figure 13:
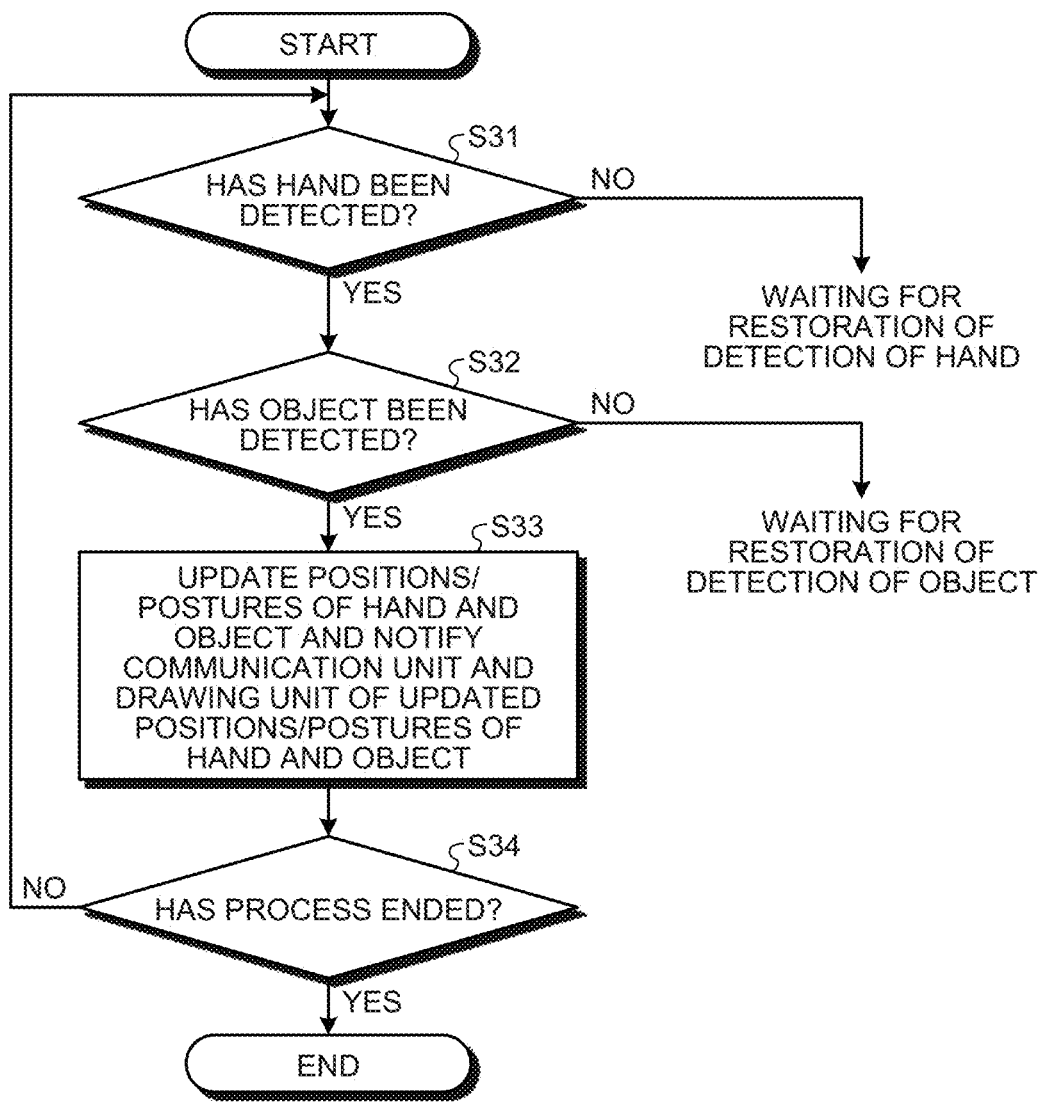
FIG. 13 is a diagram illustrating an example of a detection process for the object being grasped by the hand.

FIG. 13 is a diagram illustrating an example of a detection process for the object OB being grasped by the hand HN.

In Step S31, the determination unit 31 determines whether the information acquisition unit 20 has successfully detected the hand HN. For example, when the actual position/posture information of the hand HN is acquired from the information acquisition unit 20, the determination unit 31 determines that the hand HN has been successfully detected. When no actual position/posture information of the hand HN is acquired from the information acquisition unit 20, the determination unit 31 determines that the detection of the hand HN has failed.

In Step S31, when it is determined that the hand HN has been successfully detected (Step S31: Yes), the process proceeds to Step S32. In Step S32, the determination unit 31 determines whether the information acquisition unit 20 has successfully detected the object OB. For example, when the actual position/posture information of the object OB is acquired from the information acquisition unit 20, the determination unit 31 determines that the object OB has been successfully detected. When no actual position/posture information of the object OB has been acquired from the information acquisition unit 20, the determination unit 31 determines that the detection of the object OB has failed.

In Step S32, when it is determined that the object OB has been successfully detected (Step S32: Yes), the process proceeds to Step S33. In Step S33, the determination unit 31 outputs the actual position/posture information of the object OB and the actual position/posture information of the hand HN that are acquired from the information acquisition unit 20, to the drawing unit 32, the communication unit 50, and the recognition result holding unit 70. Then, in Step S34, the determination unit 31 performs the end determination, and repeats the processing described above until the end flag is detected.

In Step S31, when it is determined that the detection of the hand HN has failed (Step S31: No), the determination unit 31 performs the restoration waiting process which is described later.

In Step S32, it is determined when that the detection of the object OB has failed (Step S32: No), the detection state of the object OB transitions to the restoration waiting state. The determination unit 31 performs a restoration waiting process for the object OB.

Figure 14:
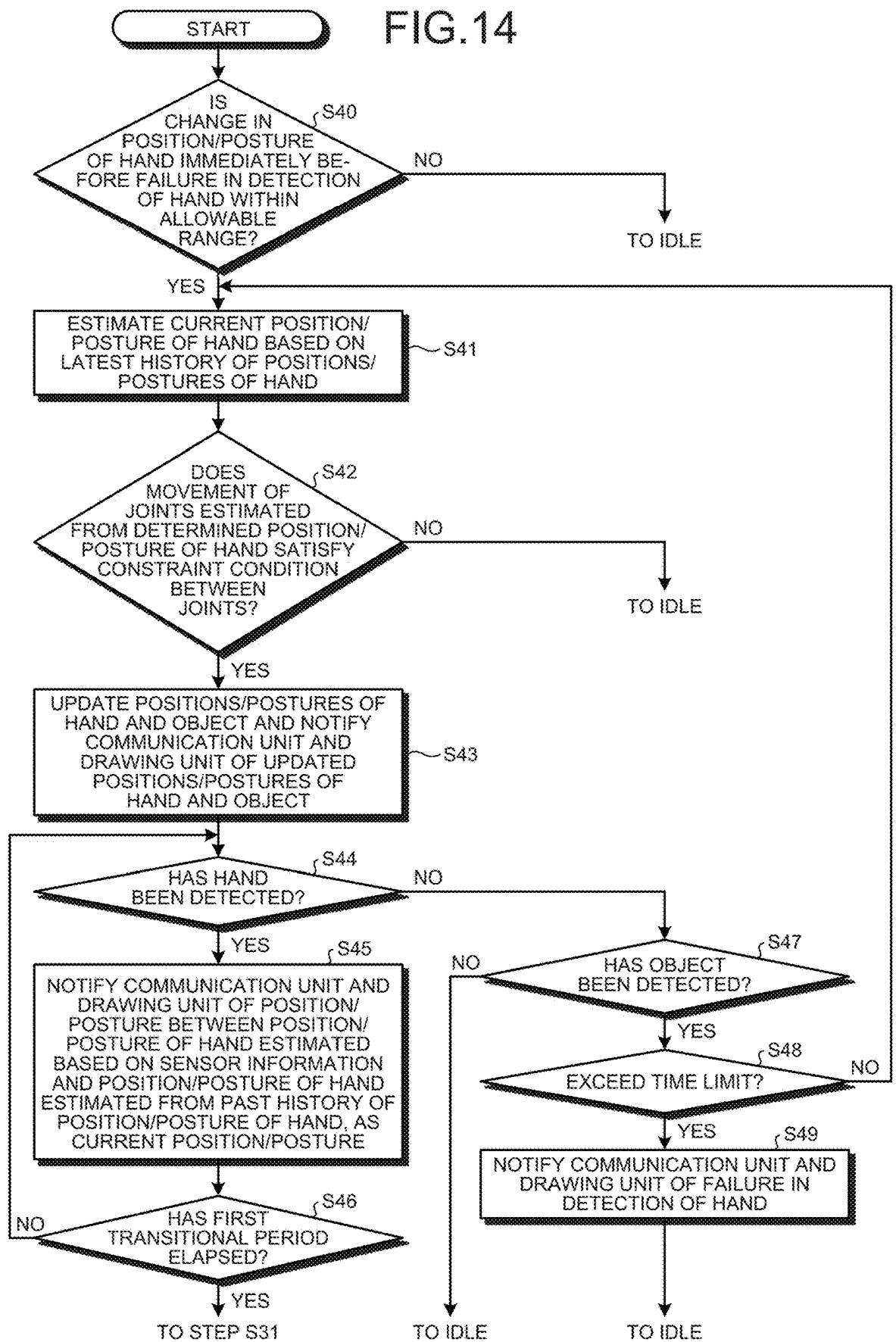
FIG. 14 is a diagram illustrating an example of a process in a restoration waiting period for the hand grasping the object.

FIG. 14 is a diagram illustrating an example of a process in the restoration waiting period for the hand HN grasping the object OB.

In Step S40, the determination unit 31 determines whether the change in the actual position/posture of the hand HN immediately before the beginning of the failure in detection of the hand HN is within the allowable range.

In Step S40, when it is determined that the change in the position and posture of the hand HN exceeds the allowable range (Step S40: No), the detection state of the hand HN transitions to the IDLE state. The determination unit 31 does not estimate the position and posture of the hand HN. The drawing unit 32 stops the display of the virtual object VOB corresponding to the hand HN until the hand HN is successfully detected.

In Step S40, when it is determined that the change in the actual position/posture of the hand HN is within the allowable range (Step S40: Yes), the process proceeds to Step S41. In Step S41, the determination unit 31 estimates the current position and posture of the hand HN on the basis of the latest history of the actual positions/postures PSA of the hand HN.

In Step S42, the determination unit 31 estimates the movement of the joints of the user U from the assumed position/posture PSE of the hand HN, on the basis of IK. The determination unit 31 determines whether the estimated movement of the joints satisfies the constraint condition between the joints.

In Step S42, when it is determined that the movement of the joints satisfies the constraint condition between the joints (Step S42: Yes), the process proceeds to Step S43. In Step S43, the determination unit 31 outputs the assumed position/posture information about the assumed position/posture PSE to the drawing unit 32 and the communication unit 50. In Step S42, when it is determined that the movement of the joints does not satisfy the constraint condition between the joints (Step S42: No), the detection state of the hand HN transitions to the IDLE state. The determination unit 31 rejects the results of the estimation of the position and posture of the hand HN, and stops the estimation of the position and posture of the hand HN until the hand HN is successfully detected. The drawing unit 32 stops the display of the virtual object VOB corresponding to the hand HN until the hand HN is successfully detected.

When the assumed position/posture information is output to the drawing unit 32 and the communication unit 50 in Step S43, the determination unit 31 determines whether the hand HN has been detected, in Step S44. For example, when the actual position/posture information of the hand HN is acquired from the information acquisition unit 20, the determination unit 31 determines that the hand HN has been successfully detected. When no actual position/posture information of the hand HN is acquired from the information acquisition unit 20, the determination unit 31 determines that the detection of the hand HN has failed.

In Step S44, when it is determined that the hand HN has been successfully detected (Step S44: Yes), the process proceeds to Step S45. In Step S45, the determination unit 31 performs the transition processing for transition to the normal tracking process.

When the hand HN is successfully detected, the detection state of the hand HN transitions to the tracking state. As described in Step S33, in the tracking state, the actual position/posture PSA detected on the basis of the sensor information is directly used as the position and posture of the hand HN. However, if the actual position/posture PSA is directly adopted, a significant difference from a preceding assumed position/posture PSE may be caused due to an error in the position and posture accumulated during the restoration waiting period. Therefore, the determination unit 31 sets a predetermined period immediately after returning to the detection of the hand HN, as the first transitional period, and gradually reduces the difference described above in the first transitional period.

For example, in the first transitional period, the determination unit 31 determines, as the current position and posture of the hand HN, the intermediate position/posture PSM between the current actual position/posture PSA based on the sensor information acquired by the physical information acquisition unit 22 and the current assumed position/posture PSE based on the past history of the actual position/posture PSA. The determination unit 31 outputs the current assumed position/posture information of the hand HN obtained by the determination to the drawing unit 32 and the communication unit 50. The drawing unit 32 controls the display of the virtual object VOB corresponding to the hand HN on the basis of the determined intermediate position/posture PSM.

In Step S46, the determination unit 31 determines whether the first transitional period has elapsed. In Step S46, when it is determined that the first transitional period has elapsed (Step S46: Yes), the process proceeds to Step S31, and the determination unit 31 performs the normal process performed in the tracking state. In a period before the detection of the hand HN fails again after the first transitional period has elapsed, the determination unit 31 determines the actual position/posture PSA of the hand HN detected on the basis of the sensor information, as the position and posture of the hand HN.

In Step S46, when it is determined that the first transitional period has not elapsed (Step S46: No), the process returns to Step S44, and the transition processing from Step S44 to Step S46 is continued until the first transitional period ends.

In Step S44, when it is determined that the detection of the hand HN has failed (Step S44: No), the process proceeds to Step S47. In Step S47, the determination unit 31 determines whether the object OB has been successfully detected. In Step S47, when it is determined that the detection of the object OB has failed (Step S47: No), the detection state of the object OB transitions to the IDLE state. The determination unit 31 stops the determination of the position and posture of the object OB until the object OB is successfully detected.

In Step S47, when it is determined that the object OB has been successfully detected (Step S47: Yes), the process proceeds to Step S48. In Step S48, the determination unit 31 determines whether the duration of the failure in detection of the hand HN exceeds a preset time limit.

In Step S48, when it is determined that the duration of the failure exceeds the time limit (Step S48: Yes), the process proceeds to Step S49. In Step S49, the determination unit 31 notifies the drawing unit 32 and the communication unit 50 of the failure in detection of the hand HN. The detection state of the hand HN transitions to the IDLE state. The determination unit 31 stops the determination of the position and posture of the hand HN until the hand HN is successfully detected. The drawing unit 32 stops the display of the virtual object VOB corresponding to the hand HN until the hand HN is successfully detected. In Step S48, when it is determined that the duration of the failure does not exceed the time limit (Step S48: No), the process returns to Step S41.

Figure 15:
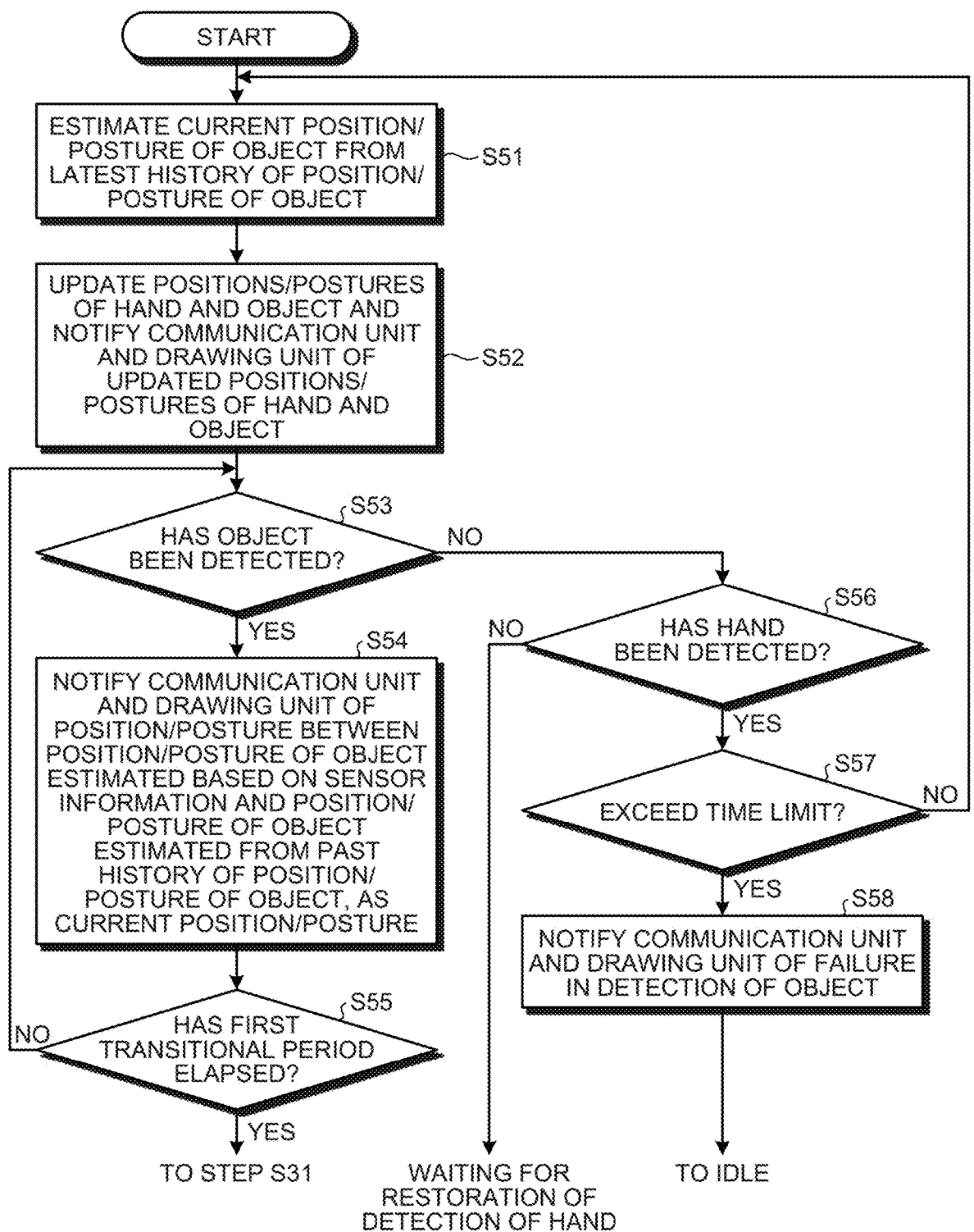
FIG. 15 is a diagram illustrating an example of a process in a restoration waiting period for the object being grasped by the hand.

FIG. 15 is a diagram illustrating an example of a process in the restoration waiting period for the object OB being grasped by the hand HN.

In Step S51, the determination unit 31 estimates the current position and posture of the object OB on the basis of the latest history of the actual position/posture PSA of the object OB.

In Step S52, the determination unit 31 outputs the assumed position/posture information about the assumed position/posture PSE of the object OB obtained by the estimation, to the drawing unit 32 and the communication unit 50.

In Step S53, the determination unit 31 determines whether the object OB has been detected. For example, when the actual position/posture information of the object OB is acquired from the information acquisition unit 20, the determination unit 31 determines that the object OB has been successfully detected. When no actual position/posture information of the object OB has been acquired from the information acquisition unit 20, the determination unit 31 determines that the detection of the object OB has failed.

In Step S53, when it is determined that the object OB has been successfully detected (Step S53: Yes), the process proceeds to Step S54. In Step S54, the determination unit 31 performs the transition processing for transition to the normal tracking process.

When the object OB is successfully detected, the detection state of the object OB transitions to the tracking state. As described in Step S33, in the tracking state, the actual position/posture PSA detected on the basis of the sensor information is directly used as the position and posture of the object OB. However, if the actual position/posture PSA is directly adopted, a significant difference from a preceding assumed position/posture PSE may be caused due to an error in the position and posture accumulated during the restoration waiting period. Therefore, the determination unit 31 sets a predetermined period immediately after returning to the detection of the object OB, as the first transitional period, and gradually reduces the difference described above in the first transitional period.

For example, in the first transitional period, the determination unit 31 determines, as the current position and posture of the object OB, the intermediate position/posture PSM between the current actual position/posture PSA of the object OB based on the sensor information acquired by the physical information acquisition unit 22 and the current assumed position/posture PSE of the object OB based on the past history of the actual positions/postures PSA of the object OB. The determination unit 31 outputs the current assumed position/posture information of the object OB obtained by the determination to the drawing unit 32 and the communication unit 50. The drawing unit 32 controls the display of the virtual object VOB corresponding to the object OB on the basis of the determined intermediate position/posture PSM.

In Step S55, the determination unit 31 determines whether the first transitional period has elapsed. In Step S55, when it is determined that the first transitional period has elapsed (Step S55: Yes), the process proceeds to Step S31, and the determination unit 31 performs the normal process performed in the tracking state. In a period before the detection of the object OB fails again after the first transitional period has elapsed, the determination unit 31 determines the actual position/posture PSA of the object OB detected on the basis of the sensor information, as the position and posture of the object OB.

In Step S55, when it is determined that the first transitional period has not elapsed (Step S55: No), the process returns to Step S53, and the transition processing from Step S53 to Step S55 is continued until the first transitional period ends.

In Step S53, when it is determined that the detection of the object OB has failed (Step S53: No), the process proceeds to Step S56. In Step S56, the determination unit 31 determines whether the hand HN has been successfully detected. In Step S56, when it is determined that the detection of the hand HN has failed (Step S56: No), the detection state of the hand HN transitions to the restoration waiting state. The determination unit 31 determines the position and posture of the hand HN on the basis of the history of the actual position/posture PSA of the hand HN immediately before the beginning of the failure in detection of the hand HN.

In Step S56, when it is determined that the hand HN has been successfully detected (Step S56: Yes), the process proceeds to Step S57. In Step S57, the determination unit 31 determines whether duration of the failure in detection of the object OB exceeds the preset time limit.

In Step S57, when it is determined that the duration of the failure exceeds the time limit (Step S57: Yes), the process proceeds to Step S58. In Step S58, the determination unit 31 notifies the drawing unit 32 and the communication unit 50 of the failure in detection of the object OB. The detection state of the object OB transitions to the IDLE state. The determination unit 31 stops the determination of the position and posture of the object OB until the object OB is successfully detected. The drawing unit 32 stops the display of the virtual object VOB corresponding to the object OB until the object OB is successfully detected. In Step S57, when it is determined that the duration of the failure does not exceed the time limit (Step S57: No), the process returns to Step S51.

2-2. Effects

In the present embodiment, the determination of the position and posture of the object OB by the determination unit 31 is performed only when the object OB is grasped by the hand HN. The object OB grasped by the hand HN is expected to be an object drawing a high degree of attention. The enhanced continuity of the position and posture of the object OB provides the display not so strange.

3. Third Embodiment

3-1. Information Processing Method

FIG. 17 is a diagram illustrating an example of information processing according to a third embodiment.

The present embodiment is different from the first embodiment in that the display control unit 30 causes the avatar AB during the restoration waiting period to perform a preset autonomous operation. The display control unit 30 sets a predetermined period immediately after the beginning of a failure in detection of the hand HN, as a second transitional period. The display control unit 30 determines the position and posture of the hand HN in the second transitional period, as the intermediate position/posture PSM between position and posture of the hand HN corresponding to the autonomous operation and the assumed position/posture PSE of the hand HN estimated on the basis of the history of the actual position/posture PSA of the hand HN immediately before the beginning of the failure in detection of the hand HN. The display control unit 30 controls the display of the virtual object VOB corresponding to the hand HN, on the basis of the determined position and posture of the hand HN.

For example, time point t1 indicates a time point of the beginning of the failure in detection of the hand HN. The determination unit 31 sets a period from time point t1 to time point t3 as the second transitional period.

At time point t1, the determination unit 31 calculates the assumed position/posture PSE of the hand HN at time point t1 on the basis of the past history of the actual position/posture PSA of the hand HN. The determination unit 31 acquires a position/posture PST at time point t1 defined by the autonomous operation. The determination unit 31 determines, as the position and posture of the hand HN at time point t1, the intermediate position/posture PSM1 between the position and posture PST at time point t1 defined by the autonomous operation and the assumed position/posture PSE at time point t1 calculated on the basis of the past history of the actual position/posture PSA.

At time point t2, the determination unit 31 acquires a position/posture PST at time point t2 defined by the autonomous operation. The determination unit 31 determines, as the position and posture of the hand HN at time point t2, the intermediate position/posture PSM2 between the position/posture PST at time point t2 defined by the autonomous operation and the intermediate position/posture PSM1 at time point t1 obtained by determination at time point t1.

At time point t3, the determination unit 31 acquires a position/posture PST at time point t3 defined by the autonomous operation. The determination unit 31 determines, as the position and posture of the hand HN at time point t3, the intermediate position/posture PSM3 between the position and posture PST at time point t3 defined by the autonomous operation and the intermediate position/posture PSM2 at time point t2 obtained by the determination at time point t2.

After time point t4, the determination unit 31 directly uses the position/posture PST defined by the autonomous operation, as the position and posture of the hand HN.

3-2. Effects

In the present embodiment, discontinuity in the position and posture of the hand HN before and after the failure in detection of the hand HN is less noticeable by the autonomous operation. The position and posture of the hand HN after the failure in detection of the hand HN gradually change so as to be a position/posture according to the autonomous operation. Therefore, enhanced continuity is provided.

Supplementary Note

Note that the present technology can also have the following configurations.

(1)

An information processing device comprising:

a head information acquisition unit that acquires a position and posture of a head of a user;

a physical information acquisition unit that acquires a position and posture of a portion of a body of the user other than the head; and a display control unit that controls display of a virtual object corresponding to the portion of the body, based on a history of the position and posture of the portion of the body and based on the position and posture of the head, in a period before the position and posture of the portion of the body are acquired by the physical information acquisition unit.

(2)

The information processing device according to (1), wherein the display control unit estimates the position and posture of the portion of the body based on the history and the position and posture of the head, and controls display of the virtual object corresponding to the portion of the body based on a result of the estimation.

(3)

The information processing device according to (2), wherein the display control unit detects a change in the position and posture of the portion of the body based on the history, does not estimate the position and posture of the portion of the body when the detected change is beyond an allowable range, and stops display of the virtual object corresponding to the portion of the body.

(4)

The information processing device according to (2), wherein the display control unit estimates movement of joints of the user from the estimated position and posture of the portion of the body, based on inverse kinematics, rejects results of the estimation of the position and posture of the portion of the body when the movement of the joints does not satisfy a constraint condition between the joints, and stops display of the virtual object corresponding to the portion of the body.

(5)

The information processing device according to any one of (1) to (3), wherein the portion of the body is a hand, and when the hand grasps an object, the display control unit controls display of a virtual object corresponding to the object, based on a history of a position and posture of the object, in a period before the position and posture of the object are acquired, and when the hand does not grasp the object, the display control unit stops display of the virtual object corresponding to the object.

(6)

The information processing device according to any one of (1) to (5), wherein the display control unit stops display of the virtual object corresponding to the portion of the body, when the period before the position and posture of the portion of the body are acquired by the physical information acquisition unit exceeds a preset time limit.

(7)

The information processing device according to (6), wherein the display control unit adjusts the length of the time limit in accordance with a magnitude of a change in the position and posture of the portion of the body in the past detected based on the history.

(8)

The information processing device according to any one of (1) to (7), wherein when a state of a failure in detection of the portion of the body transitions to a state of a success in detection, the display control unit determines the position and posture of the portion of the body in a first transitional period, as a position and posture between the position and posture of the portion of the body acquired by the physical information acquisition unit and the position and posture of the portion of the body estimated based on the history, and controls display of the virtual object corresponding to the portion of the body based on the determined position and posture.

(9)

The information processing device according to (8), wherein the display control unit determines a position and posture of the portion of the body after the first transitional period has elapsed, as the position and posture acquired by the physical information acquisition unit, and controls display of the virtual object corresponding to the portion of the body, based on the determined position and posture.

(10)

The information processing device according to any one of (1) to (9), wherein the display control unit determines a position and posture of the portion of the body in a second transitional period immediately after beginning of a failure in detection of the portion of the body, as a position and a posture between a position and a posture of the portion of the body corresponding to a preset autonomous operation and the position and posture of the portion of the body estimated based on the history, and controls display of the virtual object corresponding to the portion of the body based on the determined position and posture.

(11)

An information processing method executed by a computer, the method comprising:

acquiring a position and posture of a head of a user;

acquiring a position and posture of a portion of a body of the user other than the head; and controlling display of a virtual object corresponding to the portion of the body, based on a history of the position and posture of the portion of the body and based on the position and posture of the head, in a period before the position and posture of the portion of the body are acquired.

(12)

A program causing a computer to perform:

acquiring a position and posture of a head of a user;

acquiring a position and posture of a portion of a body of the user other than the head; and controlling display of a virtual object corresponding to the portion of the body, based on a history of the position and posture of the portion of the body and based on the position and posture of the head, in a period before the position and posture of the portion of the body are acquired.

REFERENCE SIGNS LIST

21 HEAD INFORMATION ACQUISITION UNIT
22 PHYSICAL INFORMATION ACQUISITION UNIT
30 DISPLAY CONTROL UNIT
HN HAND (PORTION OF BODY)
OB OBJECT

TM TERMINAL (INFORMATION PROCESSING DEVICE)
U USER
VOB VIRTUAL OBJECT

The invention claimed is:

1. An information processing system comprising:
circuitry configured to:
receive a first information of a first user's position and posture from a first information processing system;
receive a second information of a first real object from the first information processing system;
control a displaying of a first avatar corresponding to the first user based on the first information in a first status;
control a displaying of a virtual object based on the second information in the first status;
receive a first failure information that indicates a failure of detecting the first real object;
control a displaying of the first avatar based on a third information of the first user's position and posture in a second status; and
stop the display of the virtual object based on the first failure information in the second status,
wherein the first real object is an object which is grasped by the first user.

2. The information processing system according to claim 1, wherein
the second information includes a position and posture of the first real object.

3. The information processing system according to claim 1, wherein
the first failure information is outputted from the first information processing system based on a duration of the failure of detecting the first real object exceeding a predetermined time.

4. The information processing system according to claim 1, wherein
a part of the first avatar is displayed at a default position in the second status.

5. The information processing system according to claim 4, wherein
the part of the first avatar corresponds to a hand of the first user.

6. The information processing system according to claim 4, wherein
the circuitry is further configured to control to move the part of the first avatar to the default position based on receiving a fourth information from the first information processing system.

7. The information processing system according to claim 4, wherein
the circuitry is further configured to control to move the part of the first avatar to the default position based on a duration of the failure of detecting the first real object exceeding a predetermined time.

8. The information processing system according to claim 1, wherein
the circuitry is further configured to control a displaying of a first failure notification based on the first failure information.

9. The information processing system according to claim 8, wherein
the first failure notification is a pop-up display.

10. An information processing method executed by a computer, the method comprising:
receiving a first information of a first user's position and posture from a first information processing system;
receiving a second information of a first real object from the first information processing system;
displaying a first avatar corresponding to the first user based on the first information in a first status;
displaying a virtual object based on the second information in the first status;
receiving a first failure information that indicates a failure of detecting the first real object;
displaying the first avatar based on a third information of the first user's position and posture in a second status; and
stopping the display of the virtual object based on the first failure information in the second status,
wherein the first real object is an object which is grasped by the first user.

11. The information processing method according to claim 10, wherein
the second information includes a position and posture of the first real object.

12. The information processing method according to claim 10, wherein
the first failure information is outputted from the first information processing system based on a duration of the failure of detecting the first real object exceeding a predetermined time.

13. The information processing method according to claim 10, wherein
a part of the first avatar is displayed at a default position in the second status.

14. The information processing method according to claim 13, wherein
the part of the first avatar corresponds to a hand of the first user.

15. The information processing method according to claim 13, further comprising:
moving the part of the first avatar to the default position based on receiving a fourth information from the first information processing system.

16. The information processing method according to claim 13, further comprising:
moving the part of the first avatar to the default position based on a duration of the failure of detecting the first real object exceeding a predetermined time.

17. The information processing method according to claim 10, further comprising:
displaying a first failure notification based on the first failure information.

18. The information processing method according to claim 17, wherein
the first failure notification is a pop-up display.

19. The information processing system according to claim 1, wherein
wherein the displayed virtual object is grasped by the first user in a virtual space.

20. The information processing system according to claim 1, wherein
wherein the displayed virtual object is different than the displayed first avatar and the first real object is different than the first user.

* * * * *